US012798641B2

United States Patent

(12) United States Patent
Skeid et al.

(10) Patent No.: US 12,798,641 B2
(45) Date of Patent: Nov. 17, 2026

(54) SHELF SYSTEM, INTERCAGE LOCKING SYSTEM, AND ROLLING STORAGE MODULE WITH LOCKABLE BRAKE FOR CAGE

(71) Applicants: Eirik Skeid, Oslo (NO); Ralph Kluna, Spring Branch, TX (US)

(72) Inventors: Eirik Skeid, Oslo (NO); Ralph Kluna, Spring Branch, TX (US)

( * ) Notice: Subject to any disclaimer, the term of this patent is extended or adjusted under 35 U.S.C. 154(b) by 626 days.

(21) Appl. No.: 18/203,982

(22) Filed: May 31, 2023

(65) Prior Publication Data

US 2023/0399040 A1 Dec. 14, 2023

Related U.S. Application Data

(60) Provisional application No. 63/350,949, filed on Jun. 10, 2022.

(51) Int. Cl.
*B62B 3/00* (2006.01)
*A47B 47/00* (2006.01)

(52) U.S. Cl.
CPC .......... *B62B 3/005* (2013.01); *A47B 47/0083* (2013.01)

(58) Field of Classification Search
CPC ....... B62B 3/005; B62B 3/004; B62B 5/0457; B62B 5/0433; A47B 47/0083
See application file for complete search history.

(56) References Cited

U.S. PATENT DOCUMENTS

| | | | | |
|---|---|---|---|---|
| 11,202,502 B1 * | 12/2021 | Berry | A47B 47/0083 | |
| 2013/0002116 A1 * | 1/2013 | Lodge | A47B 81/00 | 312/351.1 |
| 2014/0049014 A1 * | 2/2014 | Schumacher | A61B 50/13 | 280/47.35 |
| 2016/0137407 A1 * | 5/2016 | Skeid | B65D 19/10 | 206/386 |

OTHER PUBLICATIONS

Tactical Locker CWM Operating Manual, product code SC-CW-MD-2D-03, Jun. 15, 2023.
MIL-STD 209K, Department of Defense Interface Standard for Lifting and Tiedown Provisions, Feb. 22, 2005.
OPNAV Instruction 5530.13C, Department of the Nave, Sep. 26, 2003.

* cited by examiner

*Primary Examiner* — Minnah L Seoh
*Assistant Examiner* — Al-Birr Rahman Chowdhury
(74) *Attorney, Agent, or Firm* — Michael A. Blake

(57) ABSTRACT

A transportation cage comprising: a first, a second, a third and a fourth corner posts; a first door rotatably attached to the first corner post; a second door rotatably attached to the fourth corner post; a shelf configured to slide into openings of a first shelf support and a second shelf support when the first door and second door are opened, the shelf locked within the first and second shelf supports when the first and second doors are closed, the shelf configured to remain in place when the first and second doors are closed when the transportation cage is in various orientations including an upside down orientation.

14 Claims, 22 Drawing Sheets

SHELF SYSTEM, INTERCAGE LOCKING SYSTEM, AND ROLLING STORAGE MODULE WITH LOCKABLE BRAKE FOR CAGE

CROSS-REFERENCES

This patent application claims priority to provisional patent application No. 63/350,949 filed on Jun. 10, 2022 by Eirik Skeid and Ralph Kluna, entitled "SHELF SYSTEM, INTERCAGE LOCKING SYSTEM, AND ROLLING STORAGE MODULE WITH LOCKABLE BRAKE FOR CAGE", which provisional application is fully incorporated by reference herein.

TECHNICAL FIELD

The present invention relates to improvements for transportation cages, and more particularly to a shelf system for a transportation cage, an intercage locking system for a transportation cage, and a rolling storage module with lockable brake for a transportation cage.

BACKGROUND

Storage devices with shelves are used for mobile operations, such as transport on a bad roads or terrain, transport on aircraft, and transport at sea. The shelves under such conditions often fall or move out of position, thereby damaging cargo and even causing dangerous conditions to personnel. In such conditions, the storage devices may be subject to negative forces (such as when travelling over rough terrain, rough seas, turbulent skies, or doing evasive maneuvers). However, such conditions will often lead to the shelves falling or being displaced. One option is to weld the shelves in place, bolt the shelves in place, or rivet the shelves in place. However, welds, bolting, and riveting in place makes the shelving units difficult or impossible to adjust. In addition, known means to secure shelves in storage devices often take up precious space inside the storage device or add too much weight to the storage devices.

Known storage products often are not made for mobile use and often a shelf is held in place by hooks which stops the shelf from moving downward when material is stored on it—but if negative force is applied to the storage product, the shelf can come off the hooks. Such negative force can occur when driving over rugged terrain, during transport by aircraft, during transport by sea, or during evasive maneuvers.

Storage devices need to be secured from theft. Currently, preventing theft is typically being solved by three methods, 1) increase the weight of the storage device to more than 500 lbs., 2) using a separate locking device like chain with padlock to secure the device to the floor or wall or something else increasing the system weight to more than 500 lbs., or 3) bolt the device to the floor.

There are already storage devices that have wheels with a brake. When the wheels are braked, an interloper could still steal the storage device by unbraking the wheel and rolling the storage device away, unless the storage device is locked to something. If the storage product is heavy enough and it does not have wheels, it is considered secured if it is above 500 lbs. according to OPNAV INSTRUCTION 5530.13C, p. 3-2, but not if it is possible to roll off with it.

Other storage devices either do not have wheels or they have a separate device that locks the storage device to something, such as a wall, floor, column, etc. Alternatively, the device is bolted to the floor or the wall. The separate locking device is securing the storage device to another physical item, like chain or wire connected to the floor, or a separate locking device which applies friction to the floor or a physical item penetrating the wheel thereby preventing rotation. Many solutions to the problem either require a separate lock or is permanently fixing the item.

Thus there is a need for improvements to transportation cages that overcomes the above-listed and other disadvantages.

SUMMARY OF THE INVENTION

The invention relates to a transportation cage comprising: a first corner post; a second corner post; a third corner post; a fourth corner post; a first door rotatably attached to the first corner post, the first door configured to open outwardly from the transportation cage; a second door rotatably attached to the fourth corner post, the second door configured to open outwardly from the transportation cage; a first set of holes located at each of the first, second, third and fourth corner posts, the first set of holes are all at or near a first vertical height on each of the first, second, third and fourth corner posts; a second set of holes located at each of the first, second, third and fourth corner posts, the second set of holes are all at or near a second vertical height on each of the first, second, third and fourth corner posts, the second vertical height is different than the first vertical height; a third set of holes located at each of the first, second, third and fourth corner posts, the third set of holes are all at or near a third vertical height on each of the first, second, third and fourth corner posts, the third vertical height is different than the first and second vertical heights; a fourth set of holes located at each of the first, second, third and fourth corner posts, the fourth set of holes are all at or near a fourth vertical height on each of the first, second, third and fourth corner posts, the fourth vertical height is different than the first, second, and third vertical heights; first shelf support configured to slide into the holes of a selected vertical height on the first and second corner posts when the first door is in an open configuration, the first shelf support having an opening; a second shelf support configured to slide into the holes of the selected vertical height of on the third and fourth corner posts when the second door is in an open configuration, the second shelf support having an opening; a shelf configured to slide into the openings of the first shelf support and second shelf support when the first door and second door are opened, the shelf locked within the first and second shelf supports when the first and second doors are closed, the shelf configured to remain in place when the first and second doors are closed when the transportation cage is in various orientations including an upside down orientation.

The invention also relates to a transportation cage comprising: a first corner post; a second corner post; a third corner post; a fourth corner post; one or more top bars located at the top and perimeter of the transportation cage; each of the top bars having horizontal through slot, the through slot configured to allow passage from the interior of the cage to the exterior of the cage via the horizontal through slot; one or more cross-top bars located at the top of the transportation cage and generally over the interior of the transportation cage; a rod with two right angle handles slideably and rotatably located inside each of the cross-top bars, with each of the right angle handles extending out from their respective cross-top bar, one of the right angle handles configured to slide into a slot of an adjacent transportation cage's top bar horizontal through slot or a slot located on a structure.

In addition, the invention relates to a transportation cage comprising: a first corner post; a second corner post; a third corner post; a fourth corner post; a first door rotatably attached to the first corner post, the first door configured to open outwardly from the transportation cage; a second door rotatably attached to the fourth corner post, the second door configured to open outwardly from the transportation cage; a first wheel located near the bottom of the first corner post; a second wheel located near the bottom of the second corner post; a third wheel located near the bottom of the third corner post; a fourth wheel located near the bottom of the fourth corner post; a brake and lock system located near the fourth wheel and in operable communication with the fourth wheel, the brake and lock system comprising: a brake mechanism configured to prevent the fourth wheel from rotating when engaged; a foot pedal configured to engage and disengage the brake mechanism; a lock lever in communication with the brake mechanism, when the lock lever is pushed in, the lock lever prevents disengagement of the brake mechanism, when the lock lever is pulled out, the brake can be disengaged, the lock lever further configured such that when the lock is pushed in, the lock lever can only be pulled out if the second door is opened, if the second door is closed, and the lock lever is pushed in, the lock lever can not be pulled out.

BRIEF DESCRIPTION OF THE DRAWINGS

The present disclosure will be better understood by those skilled in the pertinent art by referencing the accompanying drawings, where like elements are numbered alike in the several figures, in which:

FIG. 27 is a top perspective view showing the lock lever pushed in;

DETAILED DESCRIPTION OF THE INVENTION

The disclosed invention makes it possible for the end user to move the shelf to another shelf position, changing the available space in a compartment, without the use of tools, to better utilize the space inside for what they intend to store. The need to comply with negative G-forces is not only required by the MIL-STD 209K, but is also important for any user who has our storage device on a vehicle driving down a bumpy road. The MIL-STD 209K is concurrently filed in an IDS, and the MIL-STD 209K is fully incorporated by reference herein. It is an advantage to be able to adjust the shelves without the need for tools. It is also advantageous for the mechanism which secures the shelf in its position to not take up storage space inside the cage when this position is not in use. Applicants have recently prepared a document entitled "TACTICAL LOCKER CWM OPERATING MANUAL" with a product code of SC-CW-MD-2D-03. This document is concurrently filed in an IDS, and the TACTICAL LOCKER CWM OPERATING MANUAL is fully incorporated by reference herein.

A storage device securing weapons must comply with several regulations to be considered secure, of which OPNAV INSTRUCTION 5530.13C (p. 3-2) is an important regulation with respect to this invention. This regulation dictates, among several other requirements, that a storage device securing weapons must weigh 500 lbs. or more to prevent theft of the storage device. The OPNAV INSTRUCTION 5530.13C is concurrently filed in an IDS, and the OPNAV INSTRUCTION 5530.13C is fully incorporated by reference herein. For storage devices weighing less than 500 lbs., the storage device should be secured without permanently fixing the device to its surroundings. Our solution does not require a separate lock or locking device and the solution cannot be separated from the device and will therefore always be available when needed. Our brake can be opened and secured by closing the door without a need for a separate lock.

Figure 1:
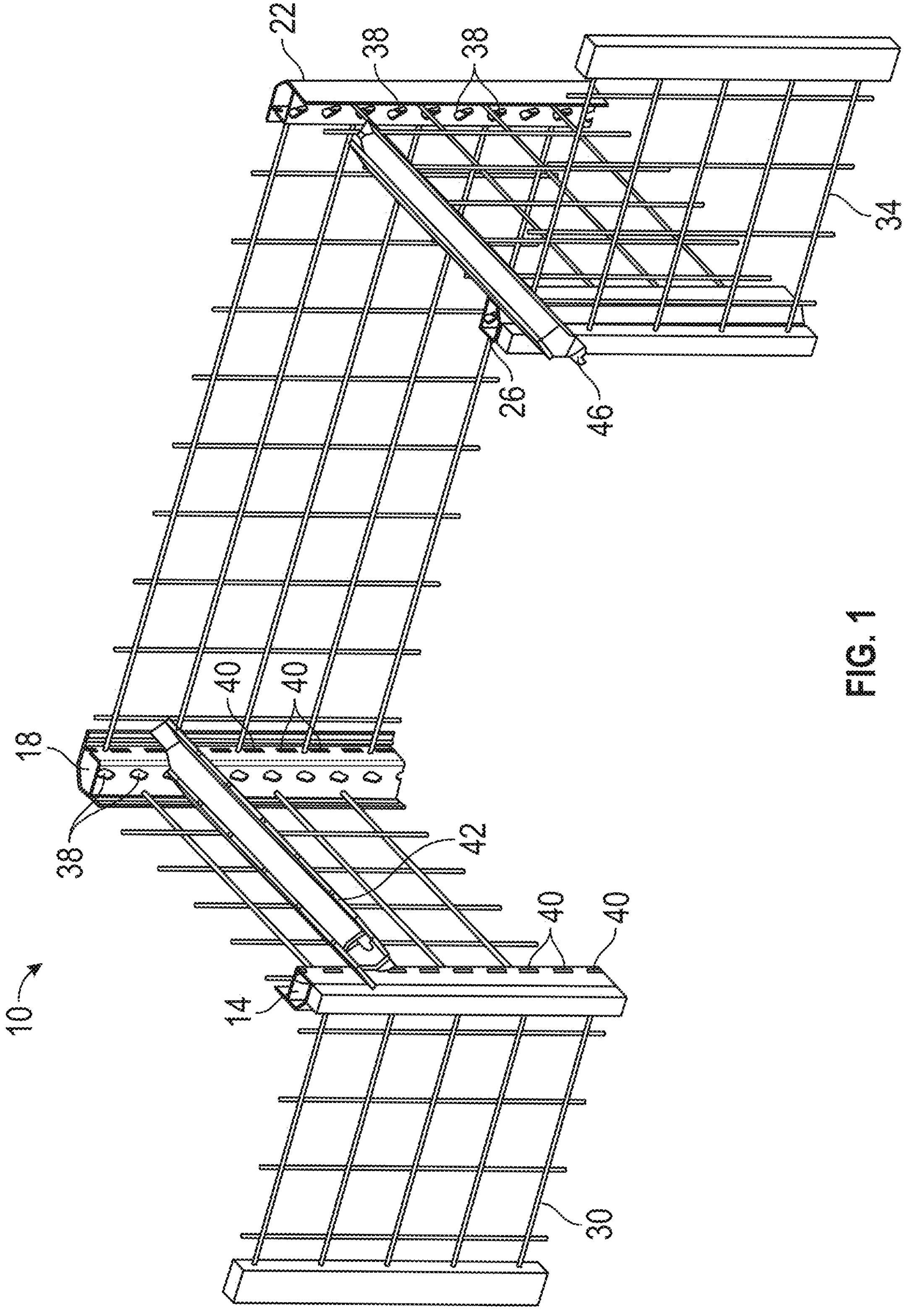
FIG. 1 shows a partial view of a transportation cage.

FIG. 1 shows a partial view of a transportation cage 10 that comprises a first corner post 14, second corner post 18, third corner post 22, and fourth corner post 26. The transportation cage 10 also comprises a first door 30 and a second door 34. Each of the corner posts 14, 18, 22, 26 may have a first plurality of holes 38. In one embodiment the holes 38 may be oval or oblong shaped. Each of the corner posts 14, 18, 22, 26 may also have a second plurality of holes 40. In one embodiment, the holes 40 may have a generally rectangular shape. A first shelf support 42 may be removeably attached inside the cage 10 to two adjacent corner posts 14, 18, 22, 26. A second shelf support 46 may be removeably attached to two adjacent corner posts 14, 18, 22, 26, but generally inside the cage 10 and on an opposite side of the cage from the first shelf support 42. Each shelf support has a tabs or extensions configured to slide into the holes 38 and 40. Each shelf support also has a slot or opening to allow a shelf to slide into the shelf supports.

Figure 2:
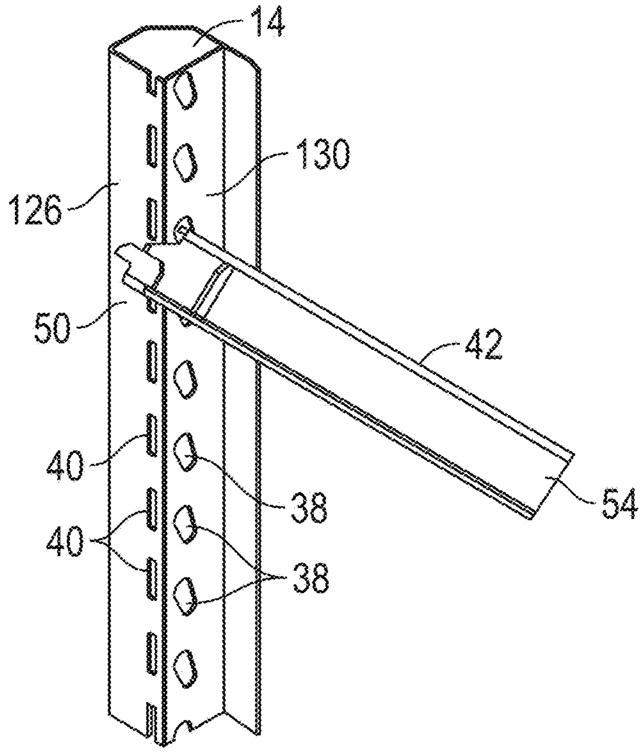
FIG. 2 shows a close up view of a first end of a first shelf support.

FIG. 2 shows a close up view of a first end 50 of the first shelf support 42 in the process of being installed on the first post 14. In this view, the extensions and tabs of the first shelf support 42 are about to or already entered into the holes 38, 40. Each shelf support has a slot or opening 54 to accept a shelf. The posts 14, 18, 22, 26 may comprise at least 2 angled planes 126 and 130. In this embodiment, the planes 126 and 130 are generally orthogonal to each other because the posts 14, 18, 22, 26 have a generally square or rectangular cross section. In other embodiments, the planes 126, 130 may comprise other angles, for instance if the posts may have a triangular cross section, or trapezoidal cross section, or parallelogram cross section. Thus, the holes 40 and 38 are generally orthogonal to each other.

Figure 3:
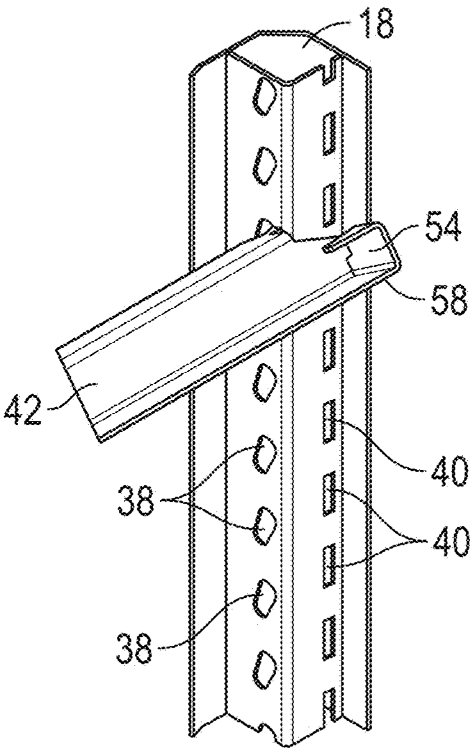
FIG. 3 shows a close up view of a second end of the first shelf support.

FIG. 3 shows a close up view of a second end 58 of the first shelf support 42. In this view, the extensions and tabs of the first shelf support 42 are about to or already entered into the holes 38, 40 of the second post 18. Each shelf support has a slot or opening 54 to accept a shelf.

Figure 4:
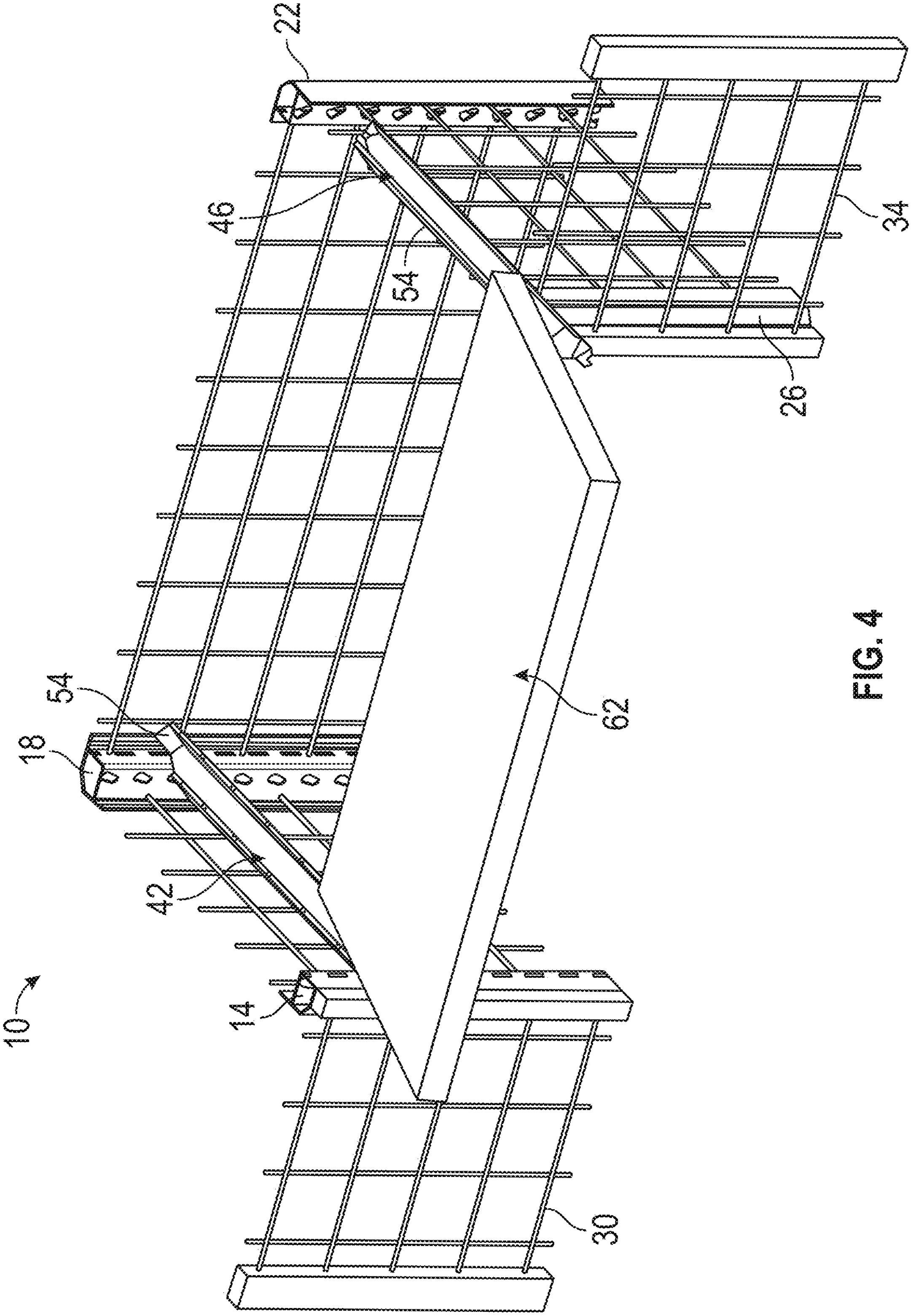
FIG. 4 shows a view of the shelf being inserted into slots or openings of the two shelf supports.

FIG. 4 shows a view of the shelf 62 being inserted into slots or openings 54 of the two shelf supports 42, 46.

Figure 5:
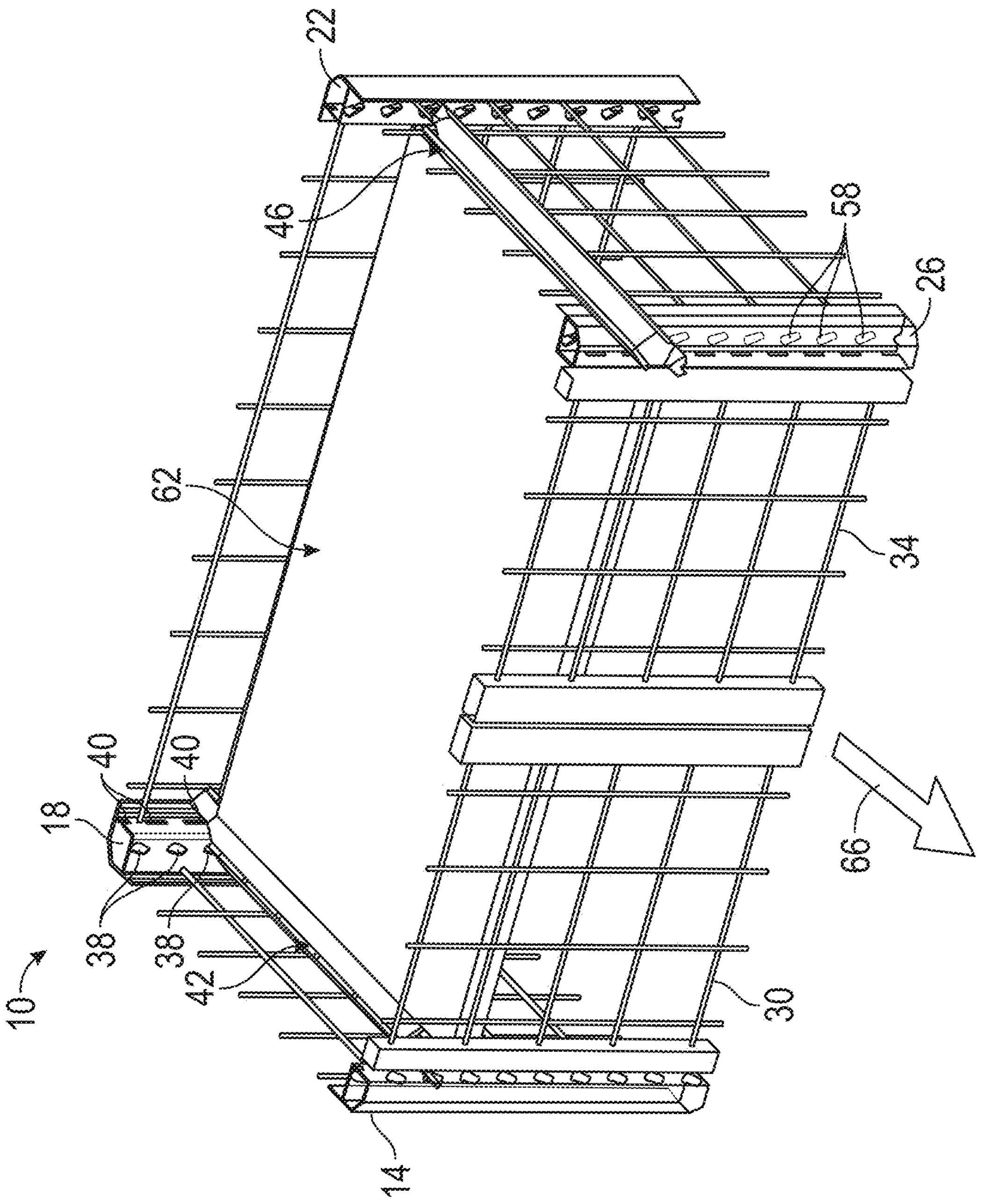
FIG. 5 shows a shelf installed in the cage with doors closed.

FIG. 5 shows a shelf 62 installed in the cage 10 with the doors 30, 34 closed. When the doors 30, 34 are closed, the shelf is locked in place. The shelf 62 can only be removed if the doors 30, 34 are opened and the shelf is slid out in the direction of the arrow 66. Even if the cage is turned upside down, the shelf 62 is locked in place, when the doors 30, 34 are closed. To move or remove the shelf 62, users must first open the doors 30, 34, then slide the shelf 62 out the direction of the arrow 66.

Figure 6:
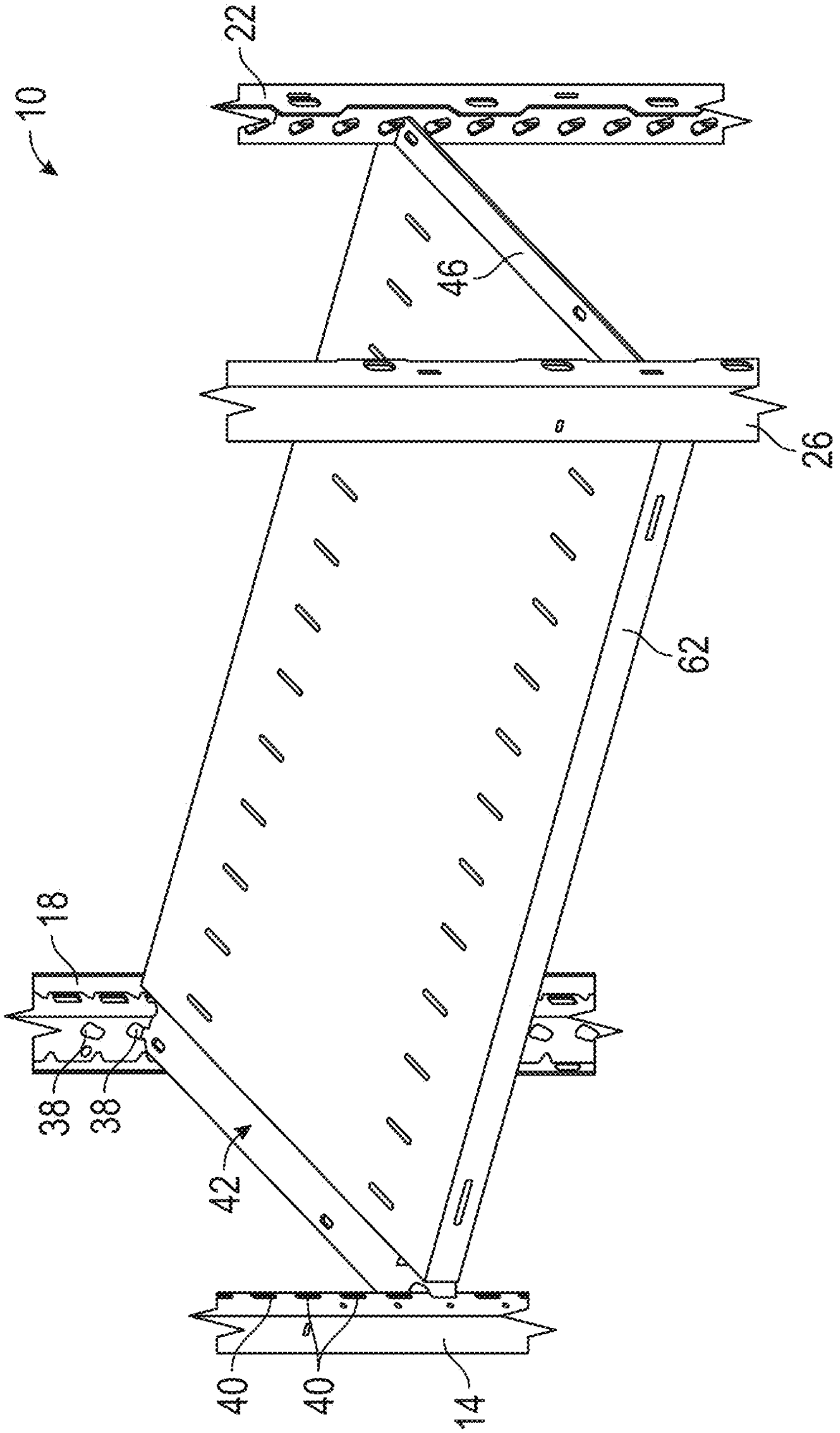
FIG. 6 shows a partial view of the shelf system for the cage.

FIG. 6 shows a partial view of the shelf system for the cage 10. In this view, the doors 34 and the walls of the cage 10 are removed.

Figure 7:
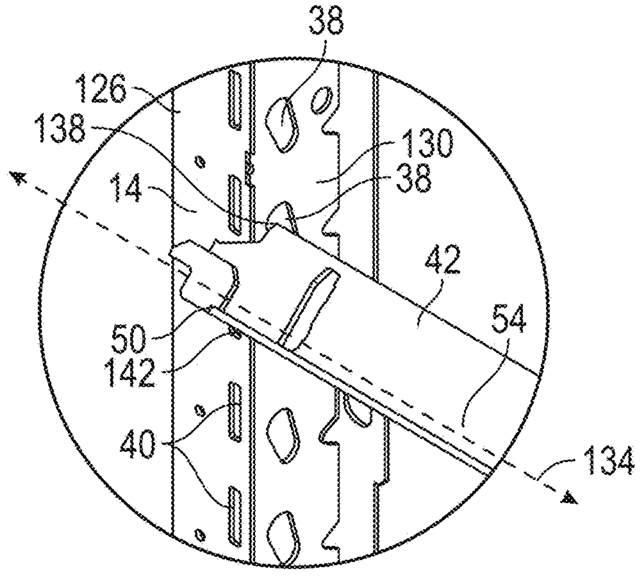
FIG. 7 shows a close up view of a first end of the first shelf support.

FIG. 7 shows another close up view of a first end 50 of the first shelf support 42 in the process of being installed on the first post 14. In this view, the extensions and tabs of the first shelf support 42 are about to or already entered into the holes 38, 40. Each shelf support 42 has a slot or opening 54 to accept a shelf. The shelf support 42 has a length direction 134. The shelf support 42 has a tab 138. Tab 138 extends from the shelf support 42 in a direction parallel to the length direction 134. The tab 138 is configured to slide into hole 38. The shelf support 42 also has a tab 142 that extends in a direction that is orthogonal to the length direction 134. Tab 142 is configured to slide into hole 40. The tabs 138 and 142, when slid into their respective holes 38 and 40, constrains the degrees of freedom of the shelf support 42 such that it is locked into place.

Figure 8:
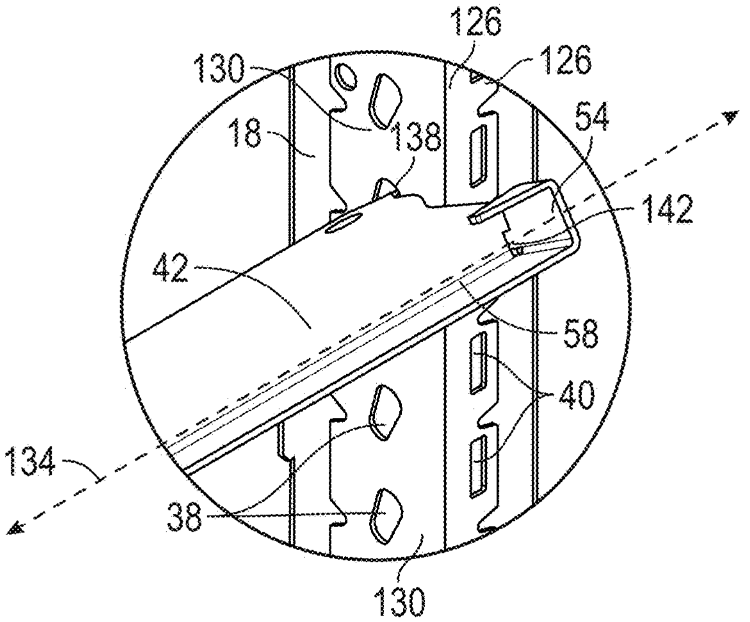
FIG. 8 shows a close up view of a second end of the first shelf support.

FIG. 8 shows another close up view of a second end 58 of the first shelf support 42. In this view, the extensions and tabs of the first shelf support 42 are about to or already entered into the holes 38, 40. Each shelf support 42 has a slot or opening 54 to accept a shelf. In one embodiment, as shown in FIGS. 7 and 8, the shelf supports 42, 46 may be angled inwards, so that it is possible to slide the tabs into the holes. The shelf support 42 has a tab 138. Tab 138 extends from the shelf support 42 in a direction parallel to the length direction 134. The tab 138 is configured to slide into hole 38. The shelf support 42 also has a tab 142 that extends in a direction that is orthogonal to the length direction 134. Tab 142 is configured to slide into hole 40. The tabs 138 and 142, when slid into their respective holes 38 and 40, constrains the degrees of freedom of the shelf support 42 such that it is locked into place. The second shelf support 46 also has tab 138, 142 in similar orientations to shelf support 42, and are configured to slide into holes 38, 40 respectively, the holes 38 and 40 are on orthogonal to each other planes of the posts 22 and 26.

Figure 9:
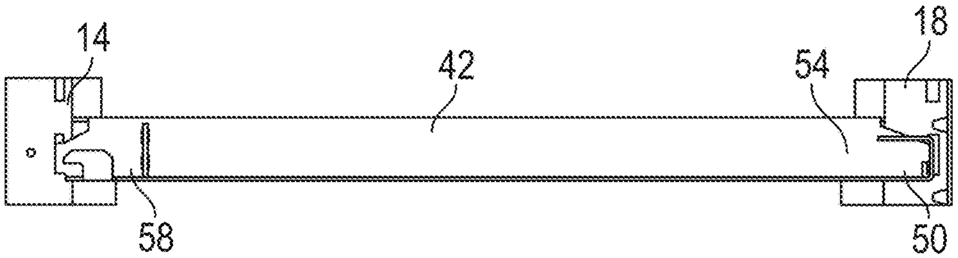
FIG. 9 is a view of the first shelf support installed on two posts.

FIG. 9 is a view of the first shelf support 42 installed on the posts 14,18.

Figure 10B:
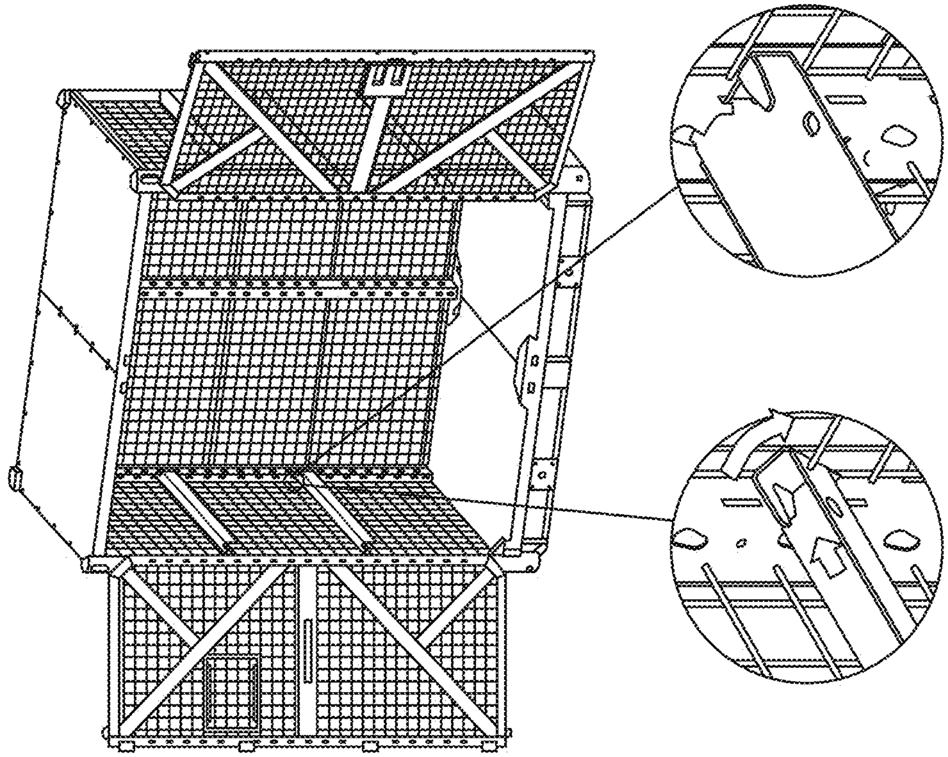
FIG. 10B shows an example of an instruction sheet showing a second step of how to insert the shelf into a cage.
Figure 10A:
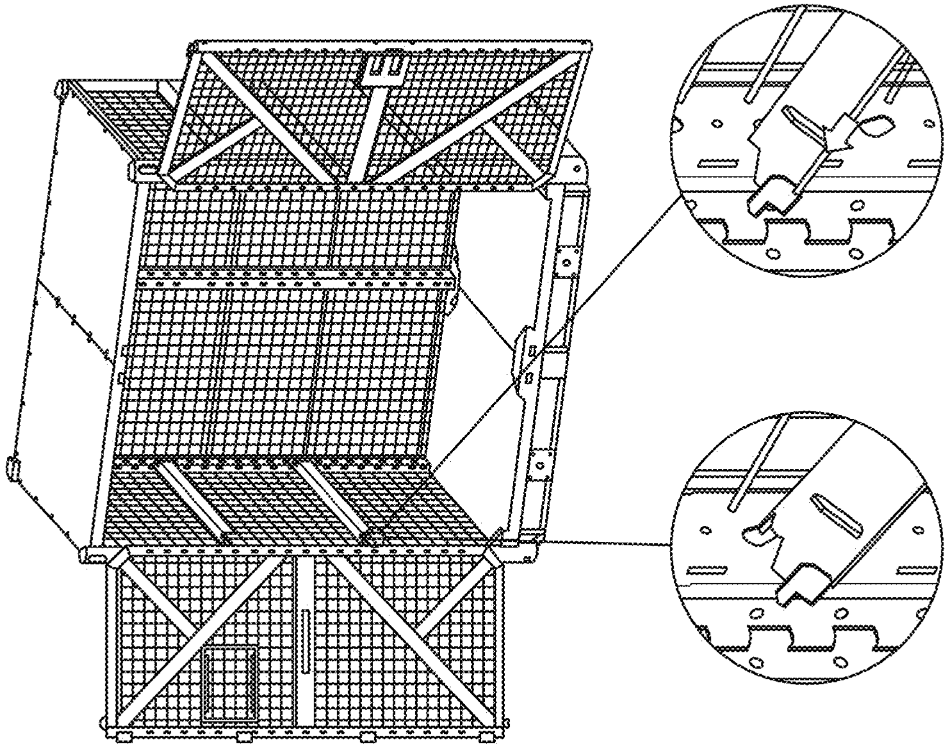
FIG. 10A shows an example of an instruction sheet showing a first step of how to insert the shelf into a cage.
Figure 10D:
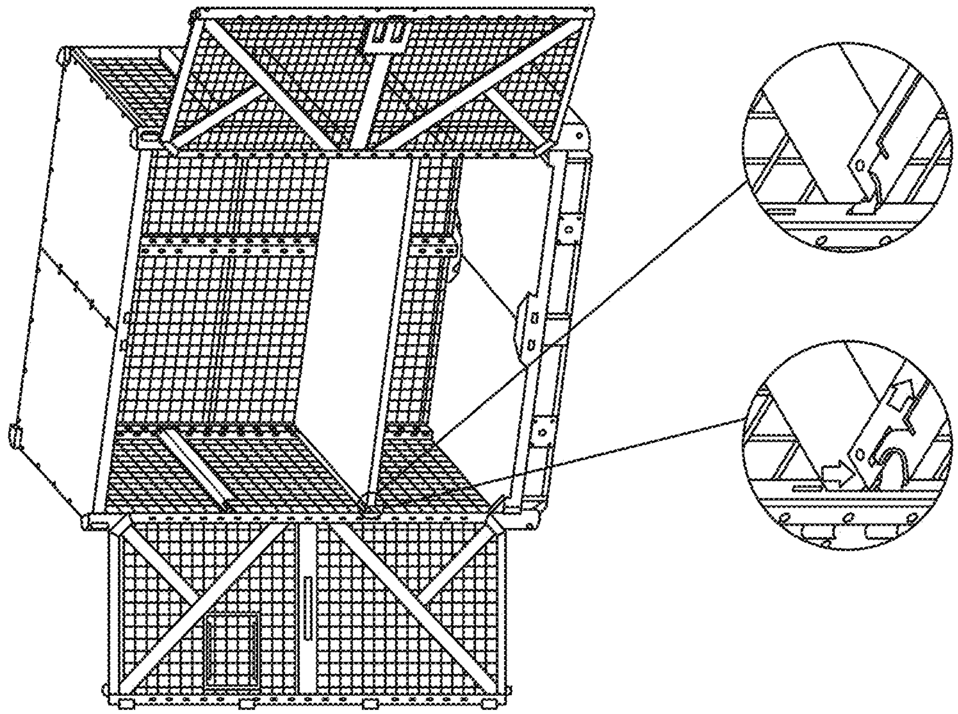
FIG. 10D shows an example of an instruction sheet showing a fourth step of how to insert the shelf into a cage.
Figure 10C:
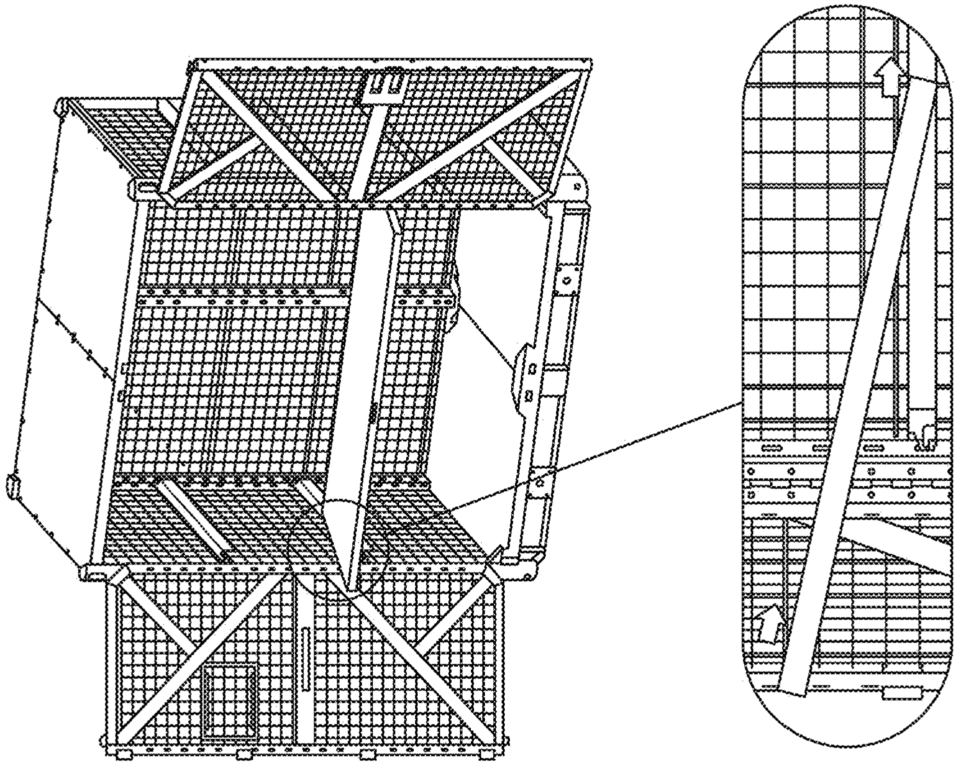
FIG. 10C shows an example of an instruction sheet showing a third step of how to insert the shelf into a cage.

FIG. 10A through 10D is an example of an instruction sheet showing how to insert the shelf into a cage along with drawings. The instructions for FIG. 10A are: Insert the front of SHELF SUPPORT into the oval hole on the CORNERPOST. The instructions for FIG. 10B are: 2. Insert the book of SHELF SUPPORT into oval hole on the CORNERPOST. Turn the SHELF SUPPORT to locking position. Do the same for opposite SHELF SUPPORT. The instructions for FIG. 10C are: Insert SHELF at an angle and push into the cage. The instructions for FIG. 10D are: Secure SHELF using hole for locking.

Figure 11:
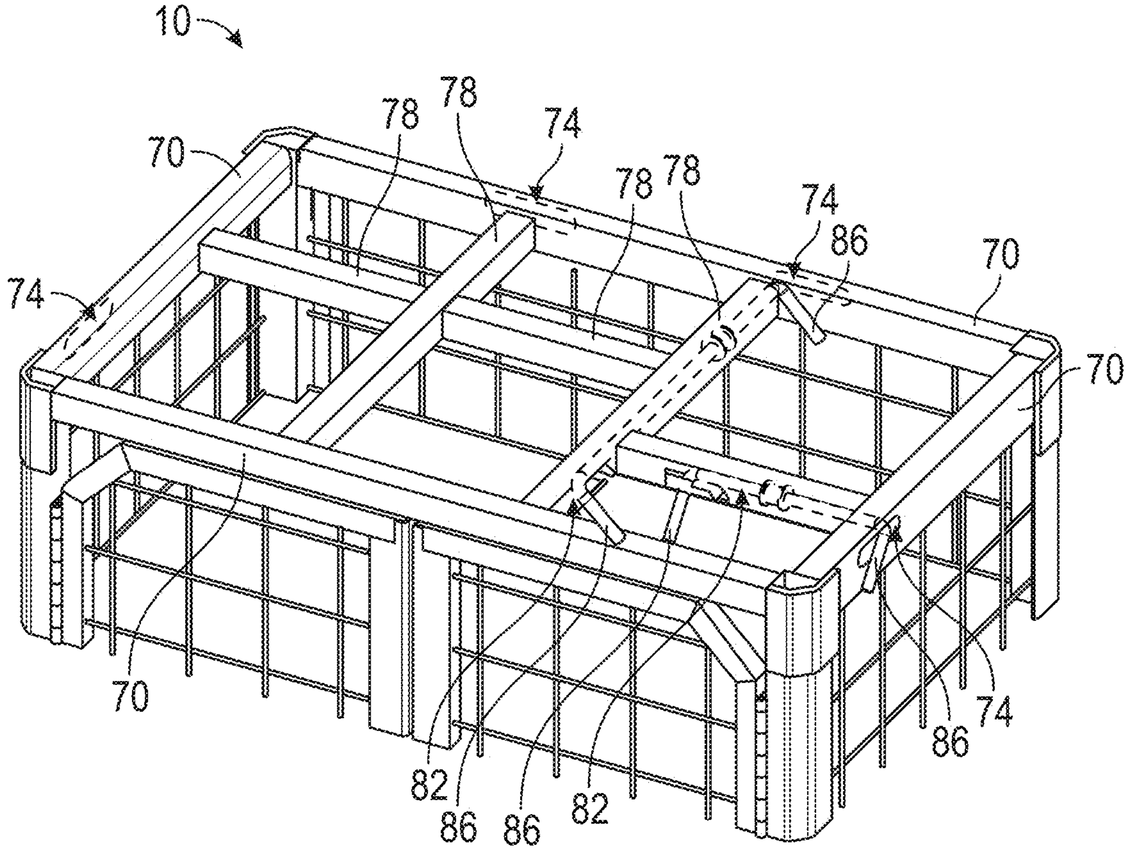
FIG. 11 shows a top perspective view of an intercage locking system.

FIG. 11 shows a view of the intercage locking system. The cage 10 has a top, either solid, wire mesh, or other suitable top. The top is not visible in these views in order to show the intercage locking system. The cage 10 may have a plurality of top bars 70 along the perimeter of the top of the cage. One or more of the top bars 70 may have a horizontal through slot 74. The through slot goes through the top bars, from the interior of the cage 10 to the exterior of the cage. The cage may have one or more cross-top bars 78, that generally connect with the top bars 70, or other cross-top bars 78, or connect a top bar 70 with a cross-top bar 78. The cross-top bars 78 are not located along the perimeter of the cage 10, but rather are located above the interior of the cage 10. Inside one or more of the cross-top bars is a rod 82 with two right angle handles 86. In one embodiment, the right angle handles 86 of the same rod 82, are parallel to each other. The rods 82 are configured to be moved by a user inside the cage, please note the rods 82 are not going to be reachable from above the cage due to the top of the cage being in the way. The user will be able to slide the rod through the through slots 74 into adjacent cages through slots 74, and then rotate the rod so that the handles 86 are generally pointing down, so that the rod is locked into the top bar 70 of an adjacent cage 10. Please note that that the cross-top bar 78 has slots and openings to permit the sliding and rotating of the rod 82 and handle 86.

Figure 12:
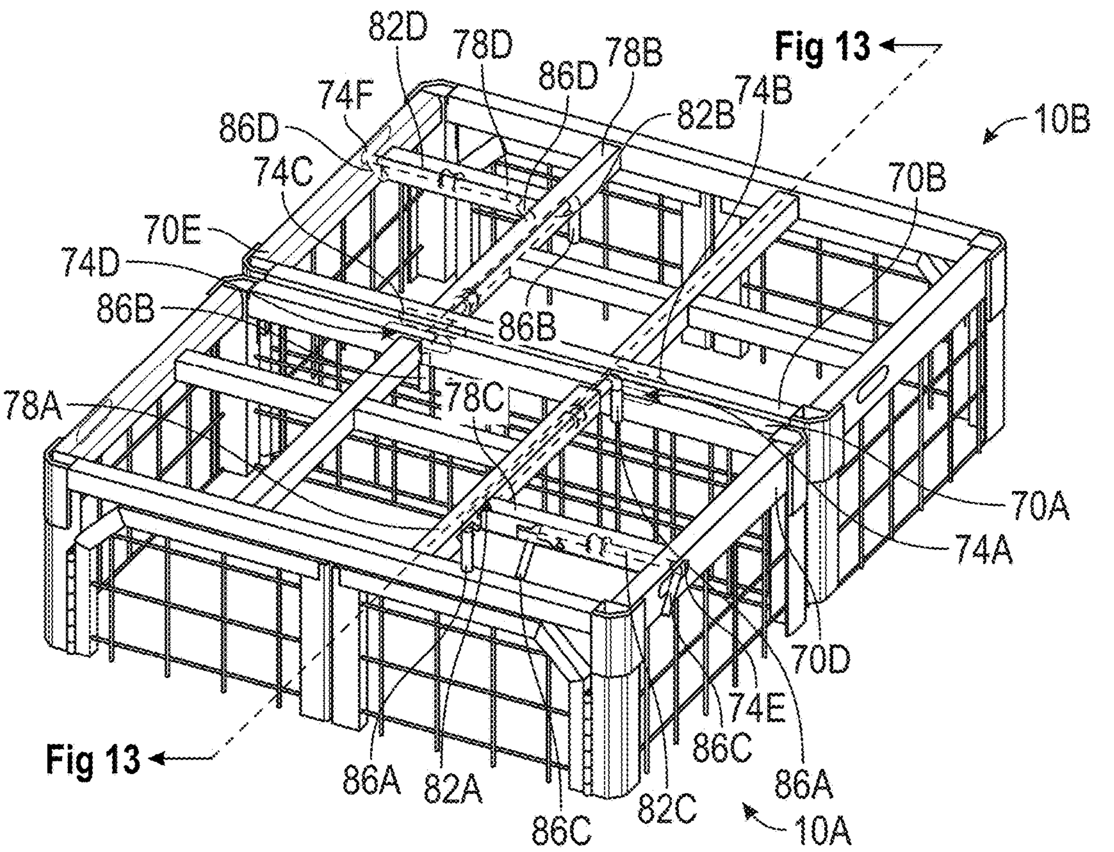
FIG. 12 shows a top perspective view of a first cage locked to a second cage.

FIG. 12 shows a first cage 10A locked to a second cage 10B. First rod 82A extends from first cage 10A through a top bar 70A of the first cage 10A, via a horizontal through slot 74A of the top bar 70A and into a top bar 70B of the second cage 10B and a horizontal through slot 74B of the top bar 70B. The rod 82A has been rotated so that the right angle handles 86A prevent the rod 82A from disconnecting from the slot 74B, thereby locking cage 10A to cage Rod 82A is mostly inside of cross-top bar 78A. Similarly, second rod 82B extends from second cage 10B through a top bar 70B of the second cage 10BA, via a horizontal through slot 74C of the top bar 70B and into a top bar 70A of the first cage 10A and a horizontal through slot 74D of the top bar 70A. The rod 82B has been rotated so that the right angle handles 86B prevent the rod 82B from disconnecting from the slot 74D, thereby also locking cage 10B to cage 10A. Rod 82B is mostly inside of cross-top bar 78B. A third rod 82C is shown in the first cage 10A. This third rod 82C is not currently be used to connect an adjacent cage, but is available to connect another cage that could be adjacent to the width dimension of the first cage 10A. The third rod 82C is shown generally inside a cross-top bar 78C. Third rod 82C does not extend through horizontal through slot 74E of top bar 70D, because there is no other cage adjacent to the width dimension of cage 10A, and it is not necessary therefore to use rod 82C to lock cage 10A to an adjacent cage. Cross-top bar 78C and top bar 70D have slots or holes on the underside of the bars to allow the right angle handles 86C to point generally downward. Similarly, a fourth rod 82D is shown in the second cage 10B. This fourth rod 82D is not currently be used to connect an adjacent cage, but is available to connect another cage that could be adjacent to the width dimension of the second cage 10B. The fourth rod 82D is shown generally inside a cross-top bar 78D. Fourth rod 82D does not extend through horizontal through slot 74F of top bar 70E, because there is no other cage adjacent to the width dimension of cage 10B, and it is not necessary therefore to use rod 82D to lock cage 10B to an adjacent cage. Cross-top bar 78D and top bar 70E have slots or holes on the underside of the bars to allow the right angle handles 86D to point generally downward. Please note, in one embodiment, only one rod 82 is necessary to lock adjacent cages. So in FIG. 12, only rod 82A (or rod 82B) is required to lock cages 10A and 10B together.

Figure 13:
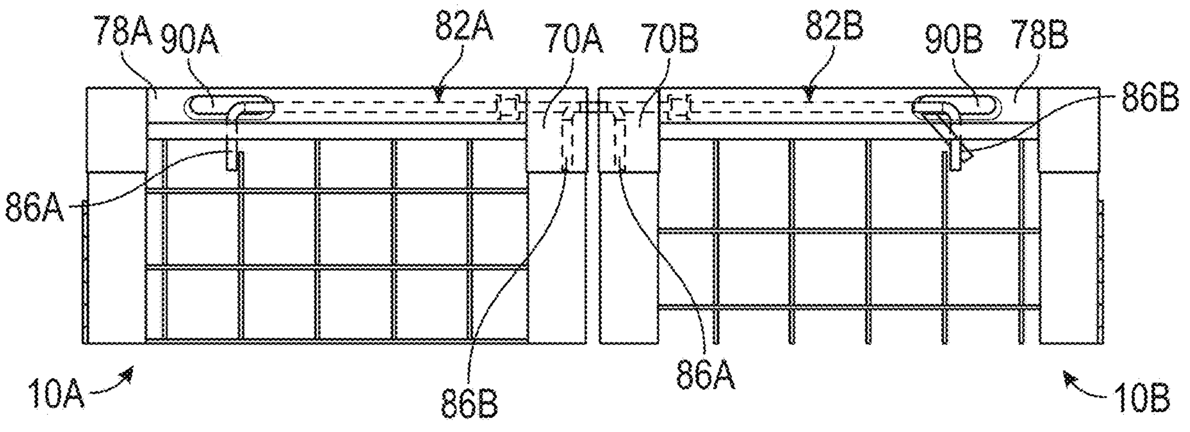
FIG. 13 is a cross-sectional view of two cages.

FIG. 13 is a cross-sectional view of cages 10A and 10B. In this view, it can be seen how rod 82A is locked into top bar 70B, and rod 82B is locked into top bar 70A. Also shown in this view is a right angle handle slot 90A in cross-top bar 78A, that allows one to slide rod 82A right and left in order to lock into adjacent cages, and/or retract back into cage 10A. Slot 90A also has a hole or right angle slot to allow the right angle handle 86A to rotate into the down position shown in FIG. 13. Also shown in this view is a right angle handle slot 90B in cross-top bar 78B, that allows one to slide rod 82B right and left in order to lock into adjacent cages, and/or retract back into cage 10B. Slot 90B also has a hole or right angle slot to allow the right angle handle 86B to rotate into the down position shown in FIG. 13.

Figure 14:
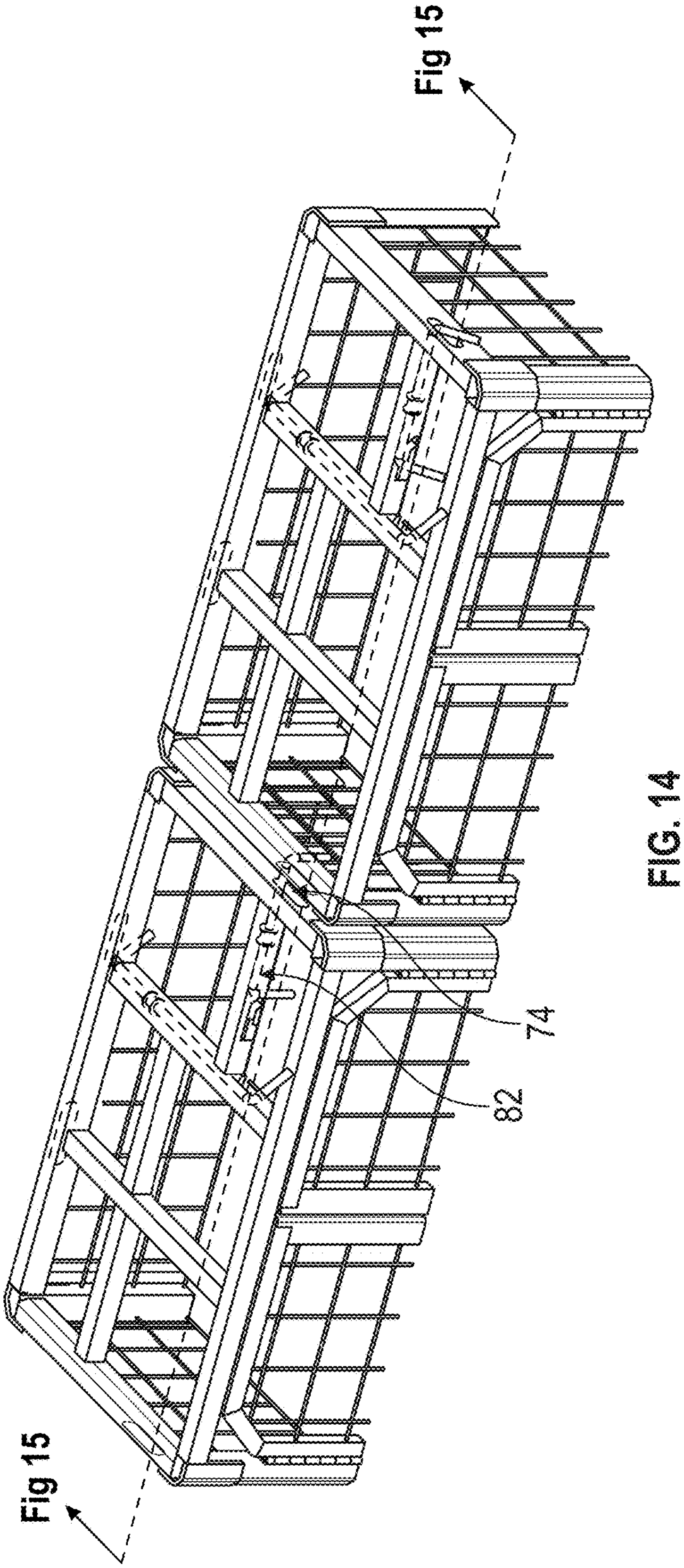
FIG. 14 is a top perspective view of two cages interlocked with an intercage locking system.

FIG. 14 is another example of the intercage locking system.

Figure 15:
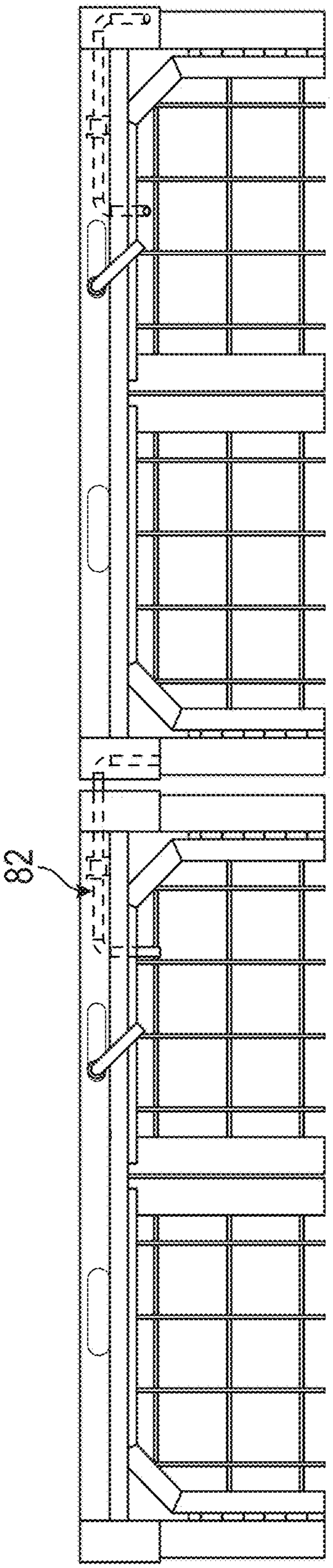
FIG. 15 is a cross-sectional view of the intercage locking system from FIG. 14.

FIG. 15 is a cross-sectional view of the intercage locking system from FIG. 14.

Figure 16:
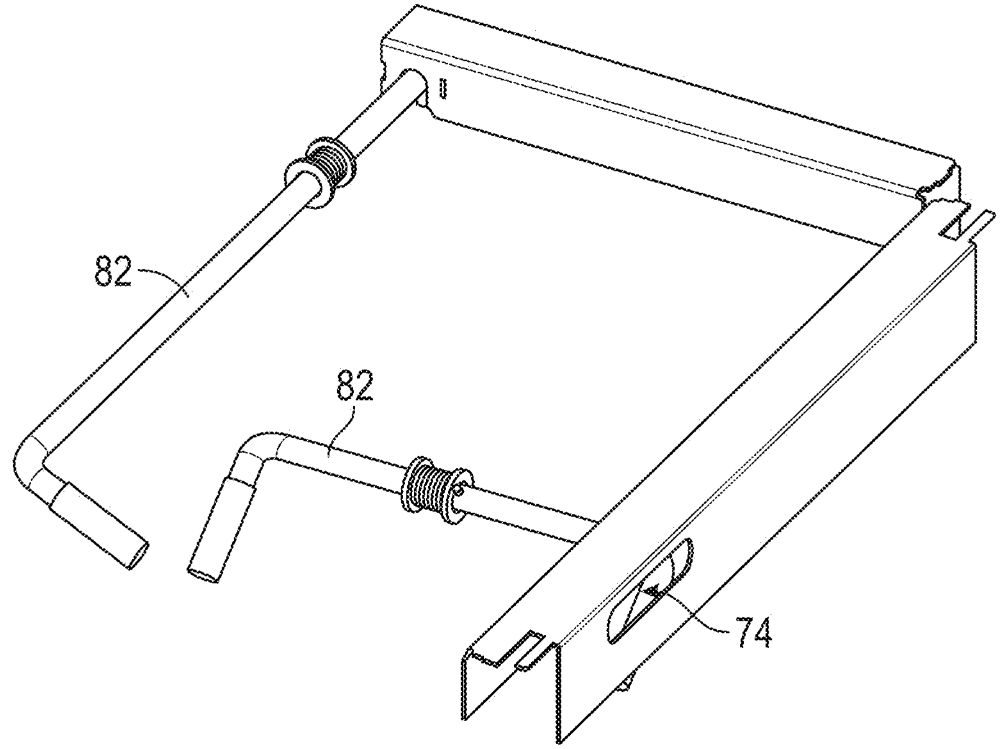
FIG. 16 is perspective view of another embodiment of the intercage locking system.

FIG. 16 is perspective view of another embodiment of the intercage locking system.

Figure 17:
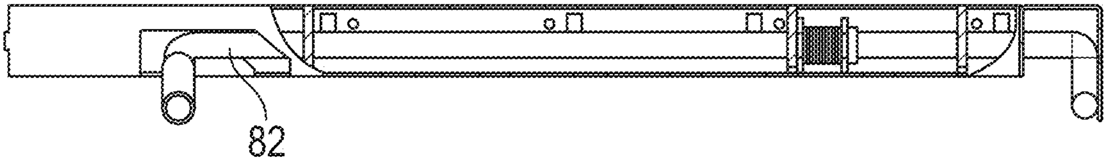
FIG. 17 is a side view of the intercage locking system from FIG. 16.

FIG. 17 is a side view of the intercage locking system from FIG. 16.

Figure 18:
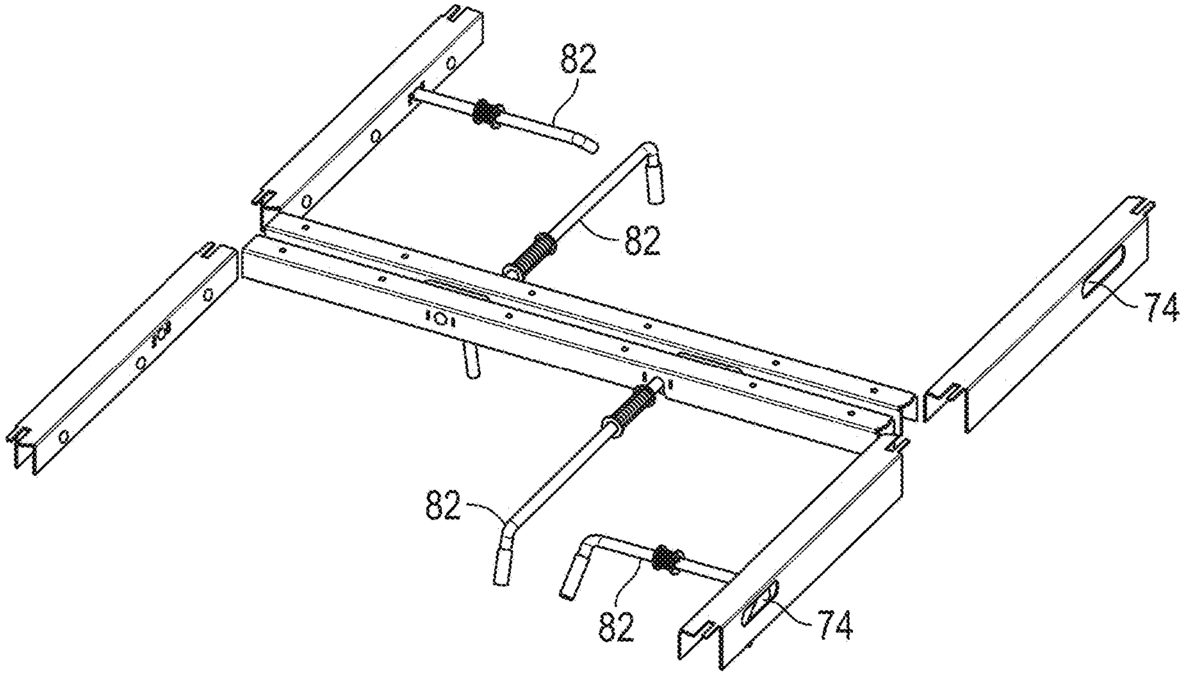
FIG. 18 is perspective view of another embodiment of the intercage locking system.

FIG. 18 is perspective view of another embodiment of the intercage locking system.

Figure 19:
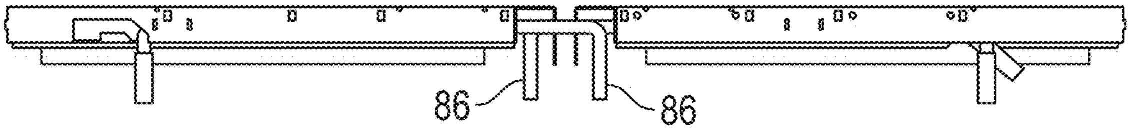
FIG. 19 is a side view of the intercage locking system from FIG. 18.

FIG. 19 is a side view of the intercage locking system from FIG. 18.

Figure 20:
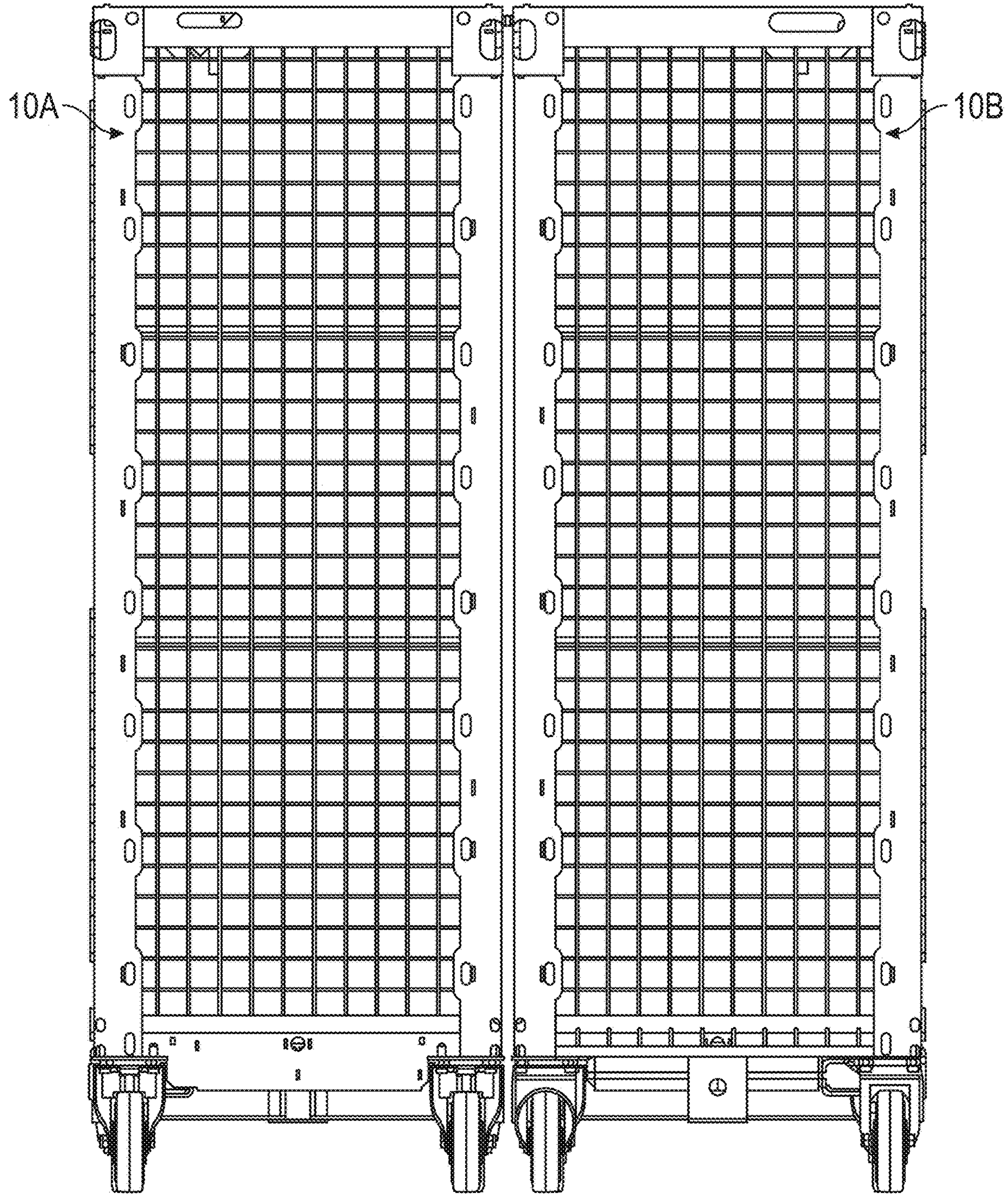
FIG. 20 shows two cages locked via the intercage locking system from FIGS. 18-19.

FIG. 20 shows two cages 10A and 10*b* locked via the intercage locking system from FIGS. 18-19.

Figure 21:
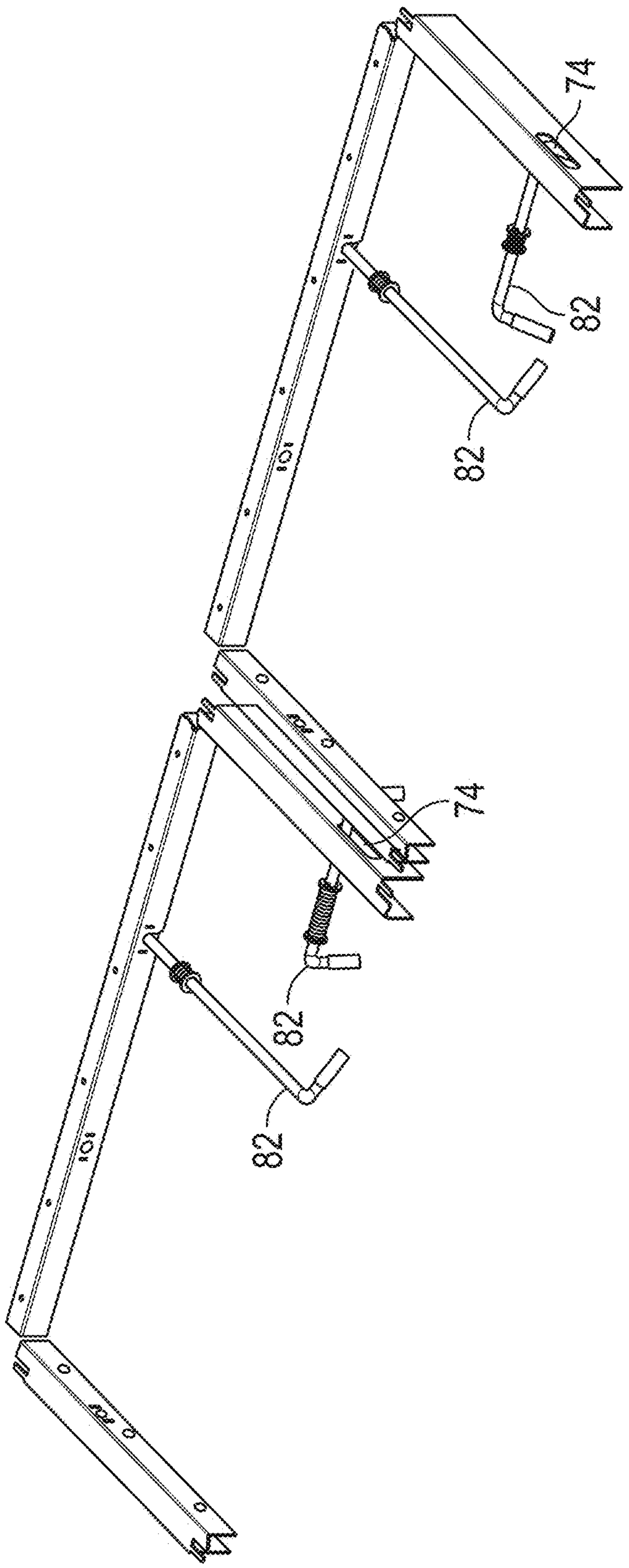
FIG. 21 is perspective view of another embodiment of the intercage locking system.

FIG. 21 is perspective view of another embodiment of the intercage locking system.

Figure 22:
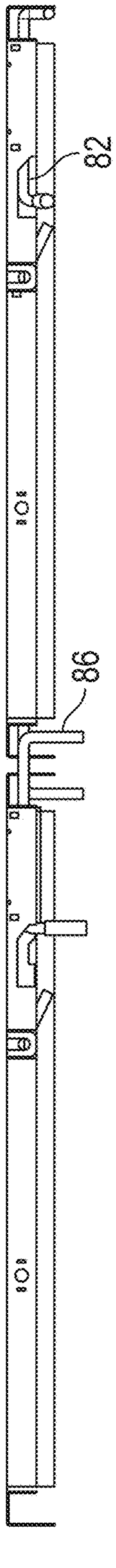
FIG. 22 is a side view of the intercage locking system from FIG. 21.

FIG. 22 is a side view of the intercage locking system from FIG. 21.

Figure 23:
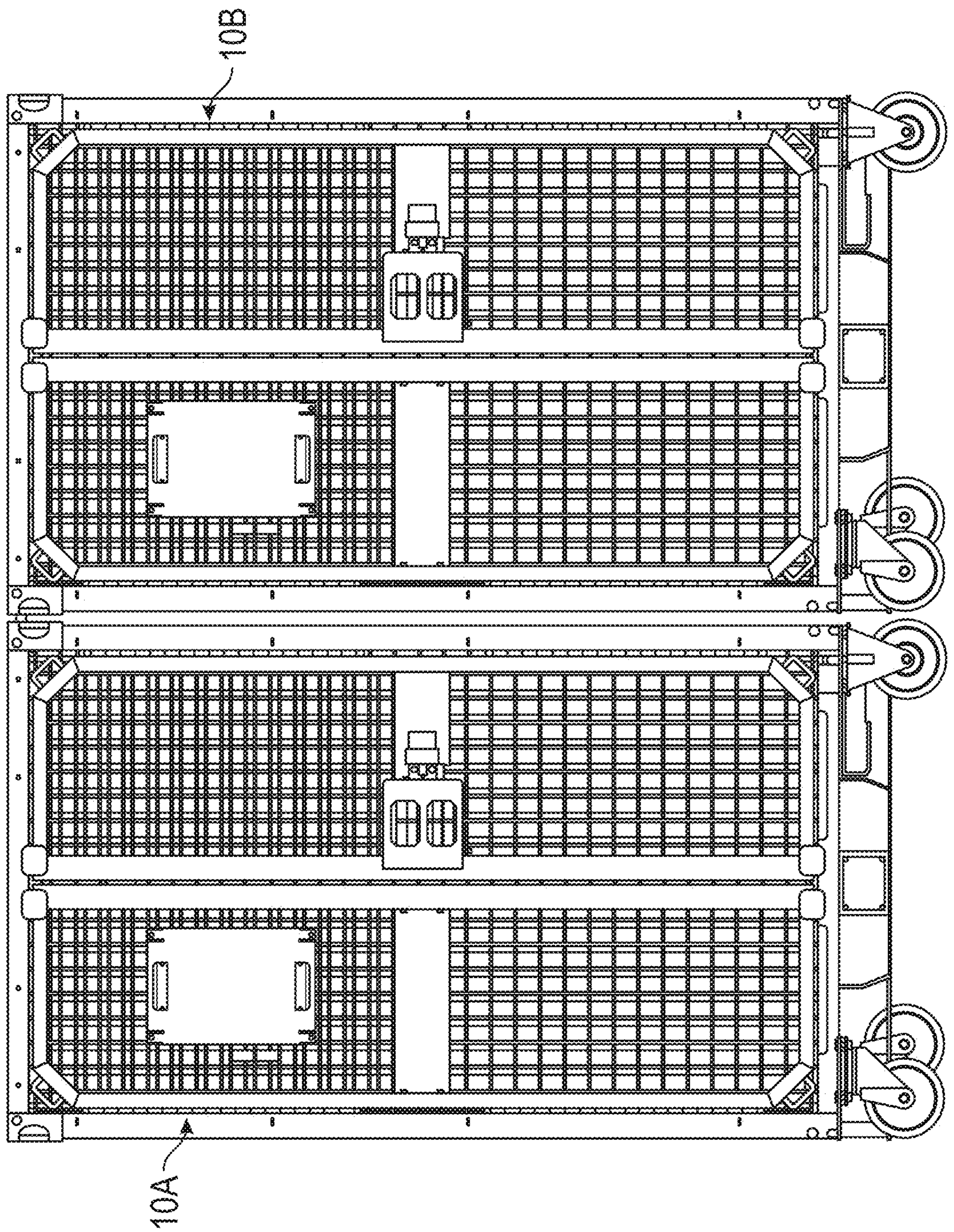
FIG. 23 shows two cages locked via the intercage locking system from FIGS. 21-22.

FIG. 23 shows two cages 10A and 10*b* locked via the intercage locking system from FIGS. 21-22.

Figure 24:
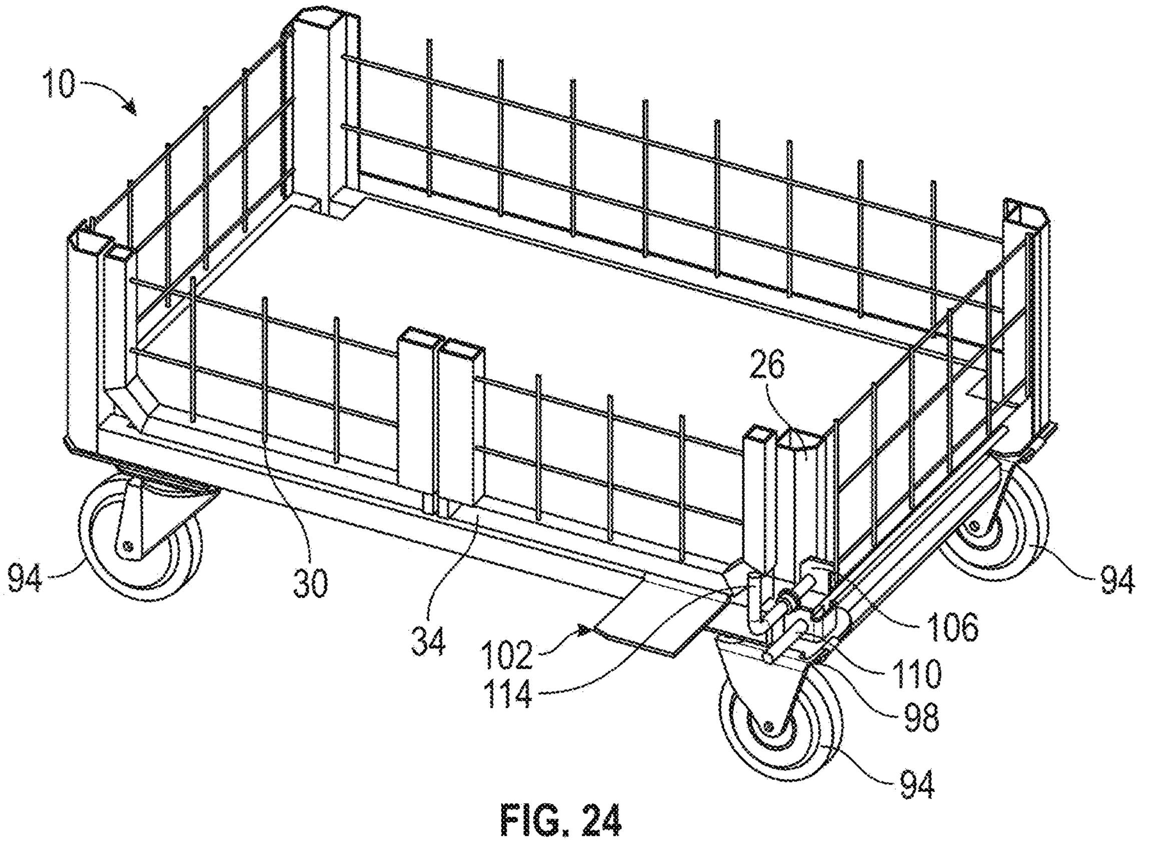
FIG. 24 shows a top perspective view of a portion of a cage.

FIG. 24 shows a portion of a cage 10, with two cage doors 30, 34. The cage 10 has wheels 94. In other embodiments, the wheels 94 may be rollers. One or more of the wheels 94 may have a brake and lock system 98. The brake and lock system 98 would generally be blocked from this view by the fourth corner post 26 and door 34. However, the brake and lock system 98 is made visible in this view so the reader can understand how the brake and lock system operates. The brake and lock system 98 comprise a foot pedal 102 that engages the brake. When the foot pedal 102 is depressed, it rotates a brake mechanism 106 that engages the brake and prevents one or more wheels 94 from freely rotating. In one embodiment the brake mechanism 106 is in communication with a brake rod 110 that can engage a brake on an adjacent wheel 94. The brake and lock system 98 comprises a lock lever 114. When the lock lever 114 is engaged, the brake is locked in an engaged configuration, and the braked wheels cannot be unbraked until the lock lever 114 is disengaged. The lock lever 114 is generally visible from behind the third post 26 and door 34, unless it is pushed in the direction of arrow 118 (see FIGS. 26 and 27).

Figure 25:
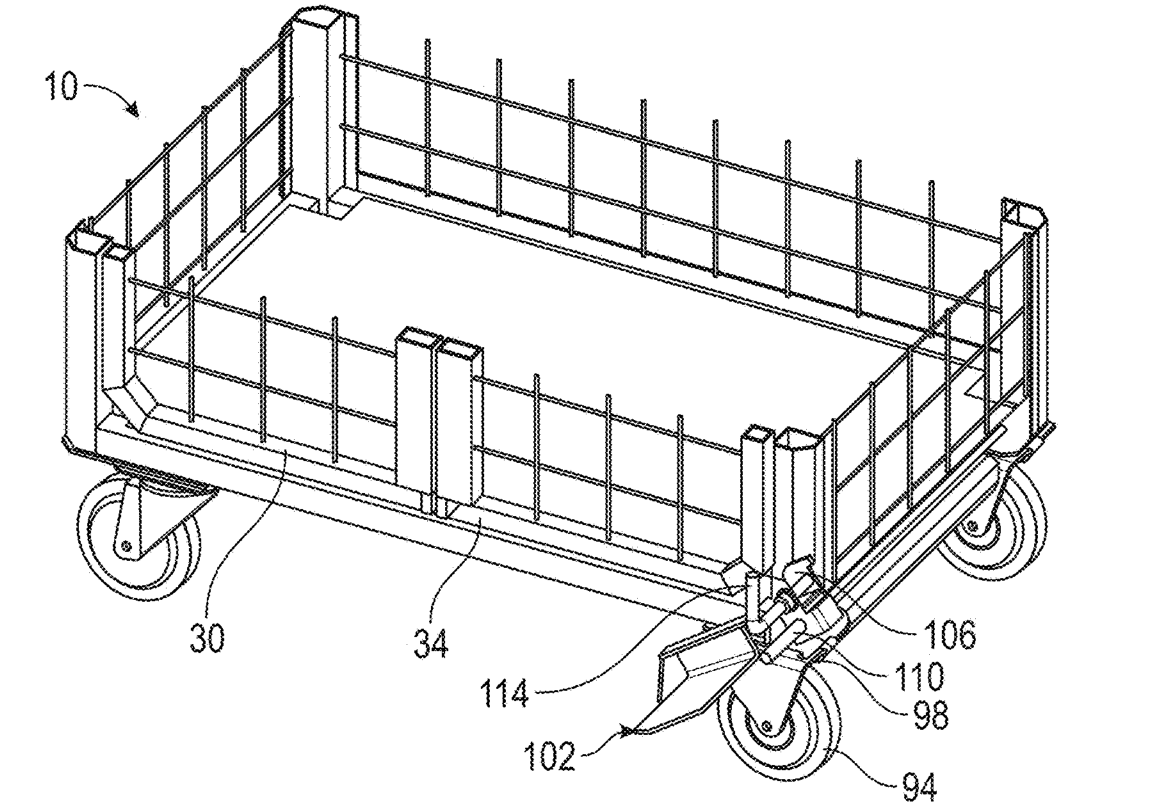
FIG. 25 is a top perspective view of the brake and lock system from FIG. 24.

FIG. 25 is a view of the brake and lock system 98 from FIG. 24, but with the foot pedal 102 in a down and braked position. In this view, one can see that the brake mechanism has rotated counter-clockwise about 35°.

Figure 26:
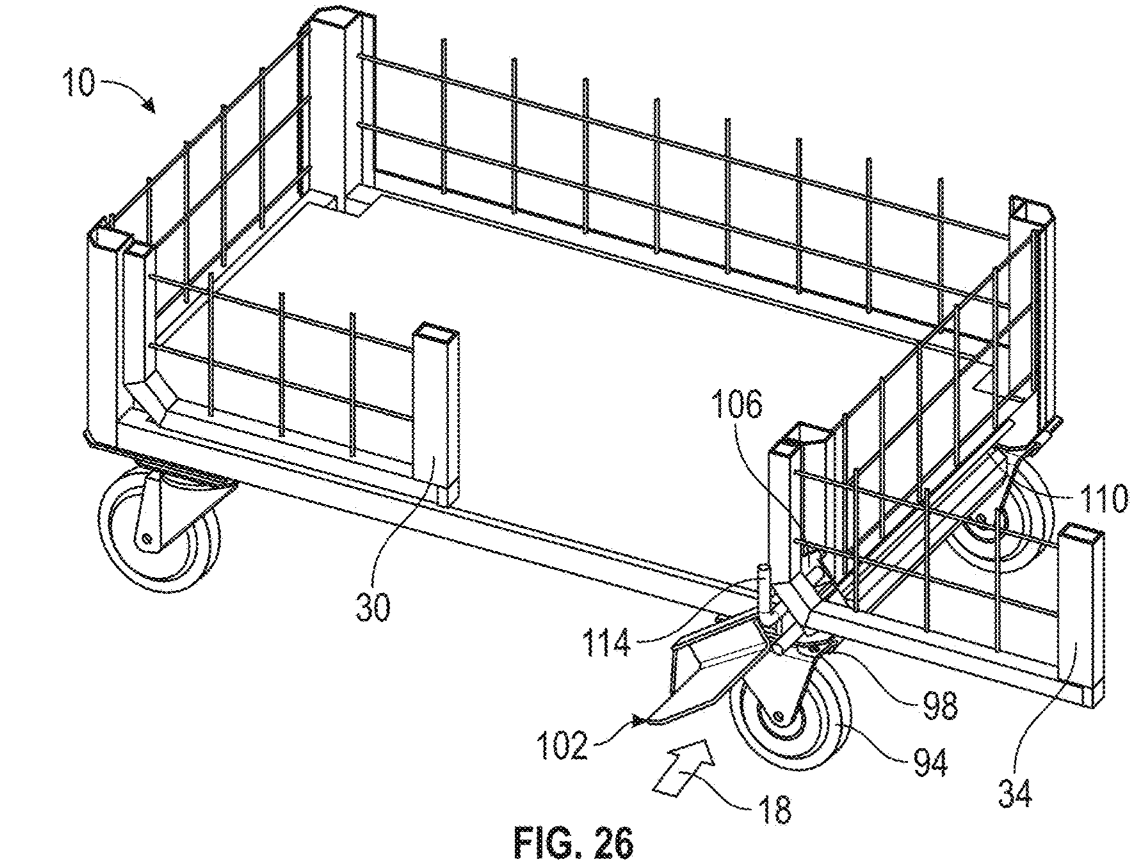
FIG. 26 is a top perspective view of the brake and lock system from FIGS. 24 and 25.

FIG. 26 is a view of the brake and lock system 98 from FIGS. 24 and 25 but with the door 34 opened. With the door open, the lock lever 114 can be pushed in in the direction of the arrow 118. When pushed in, the lock lever 114 will block the brake mechanism 106 from rotating to an unbraked position. FIG. 26 shows the lock lever 114 in an unlocked position.

Figure 27:
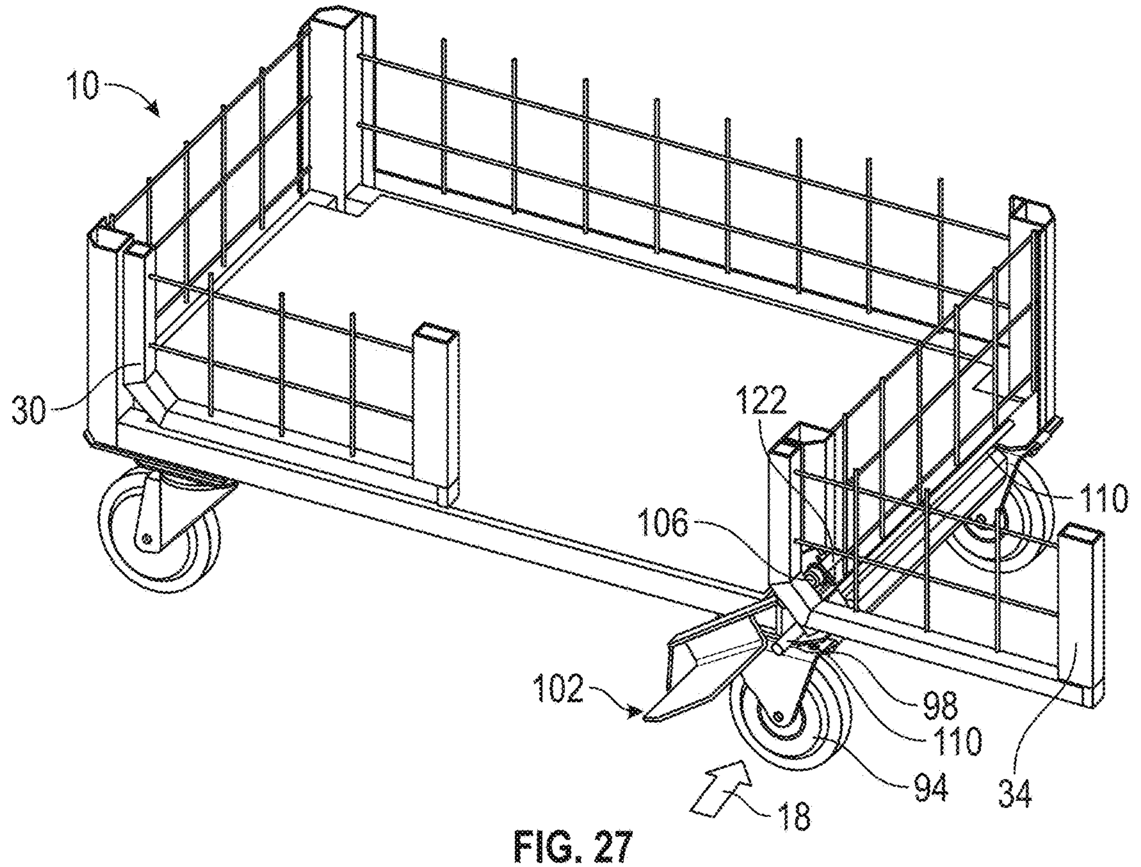

FIG. 27 shows the lock lever 114 pushed in (in the direction of the arrow 118), such that a portion of the lock lever 114 blocks the brake mechanism 106 from being able to rotate to an unbraked position. A portion of the lock lever 114 is unable to be seen due to the door 34 being in the line of sight of the lock lever 114 now that it is pushed into the locked position. However, the blocking portion 122 of the lock lever 114 can be seen blocking the brake mechanism 106.

Figure 28:
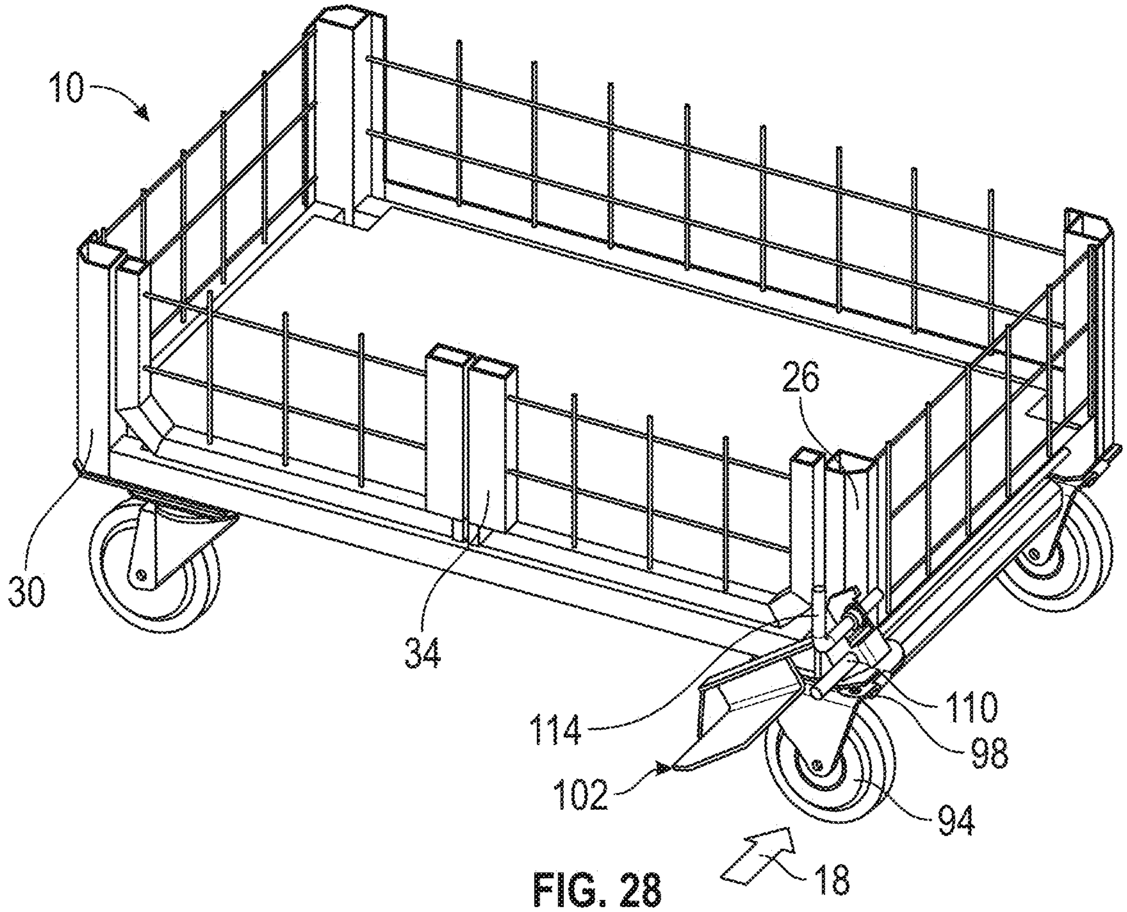
FIG. 28 is a top perspective view showing a portion of the lock lever blocking the brake mechanism.

FIG. 28 shows the lock lever 114 pushed in (in the direction of the arrow 118), such that a portion of the lock lever 114 blocks the brake mechanism 106 from being able to rotate to an unbraked position and the door 34 closed. In this view, most of the brake and lock system (except for the pedal 102) would be blocked from view due to the fourth post 26 and door 34. However, the parts of the brake and lock system 98 that would be blocked from view are made visible in this view in order that the reader can understand how the system operates. The door 34, in a closed position, makes it impossible to pull the lock lever 114 out, in a direction opposite arrow 118, in order to unlock the brake mechanism, and allow the brake mechanism to be put in an unbraked position.

Figure 29:
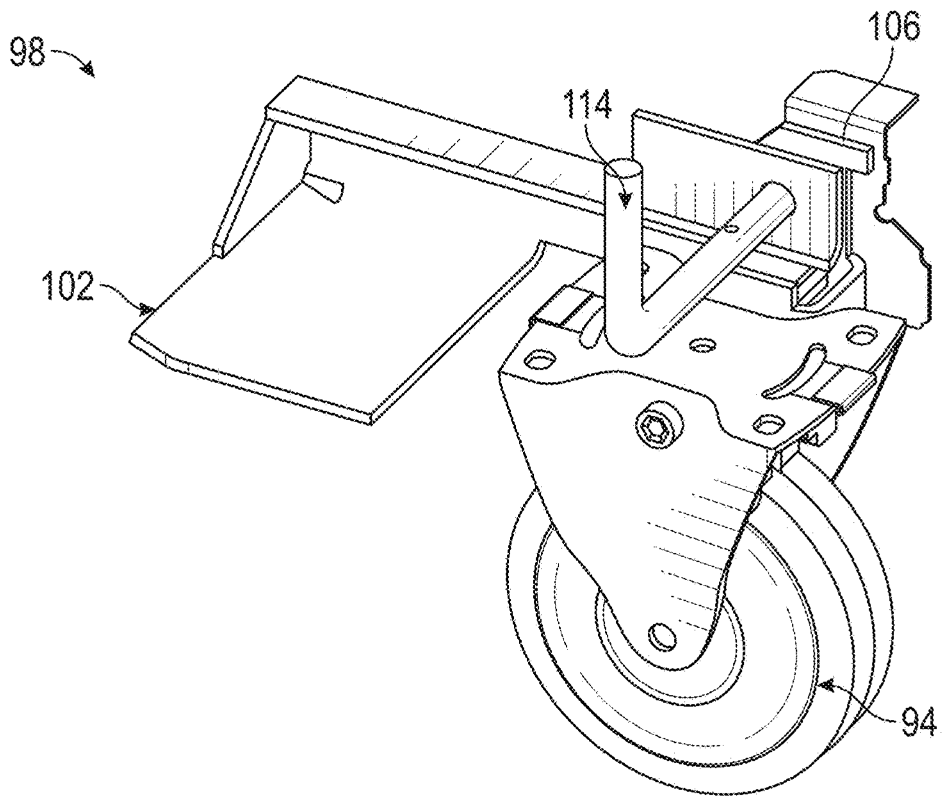
FIG. 29 is a top perspective view showing a close up view of the wheel and brake and lock system.

FIG. 29 shows a close up view of the wheel 94 and brake and lock system 98. In this view the lock lever 114 is in an unlocked position and the brake pedal 102 is in an unbraked orientation.

Figure 30:
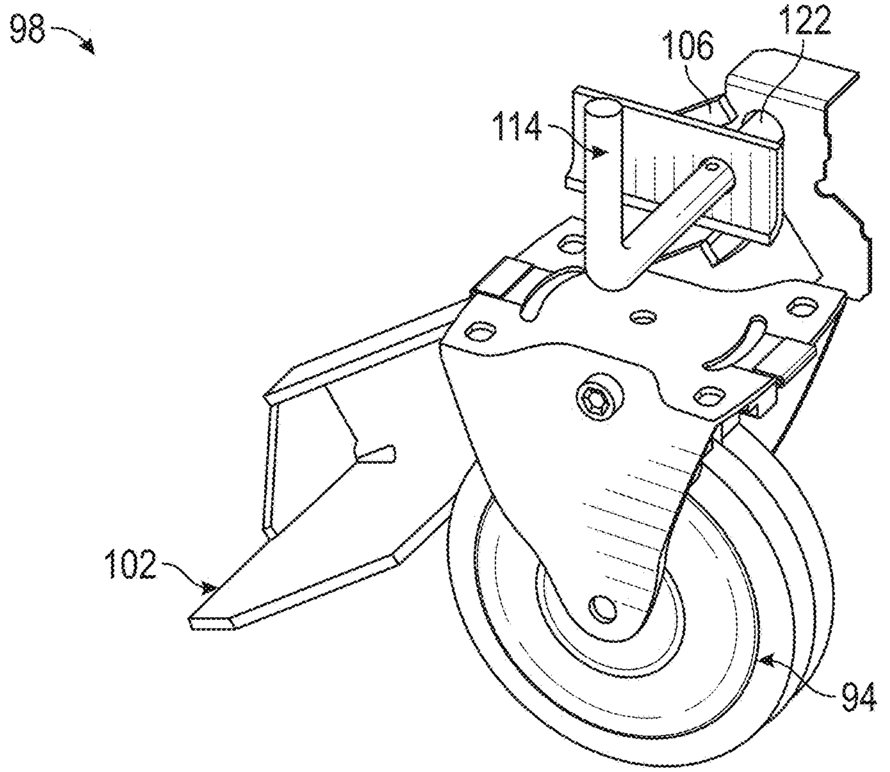
FIG. 30 is a top perspective view showing a close up of the wheel, brake, and lock system.

FIG. 30 shows a close up view of the wheel 94 and brake and lock system 98. In this view the lock lever 114 is in a locked position and the brake pedal 102 is in a braked orientation.

Figure 31:
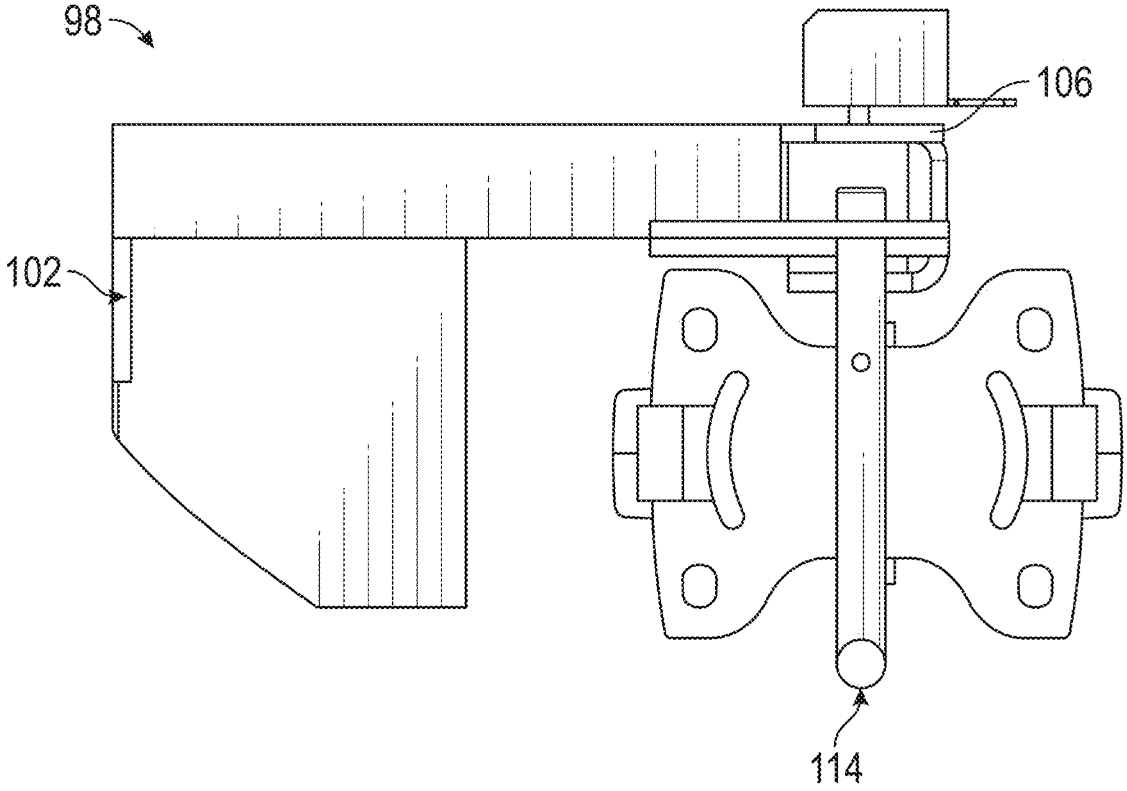
FIG. 31 is a top view of the brake and lock system.

FIG. 31 is a top view of the brake and lock system 98. In this view the lock lever 114 is in an unlocked position and the brake pedal 102 is in an unbraked orientation.

Figure 32:
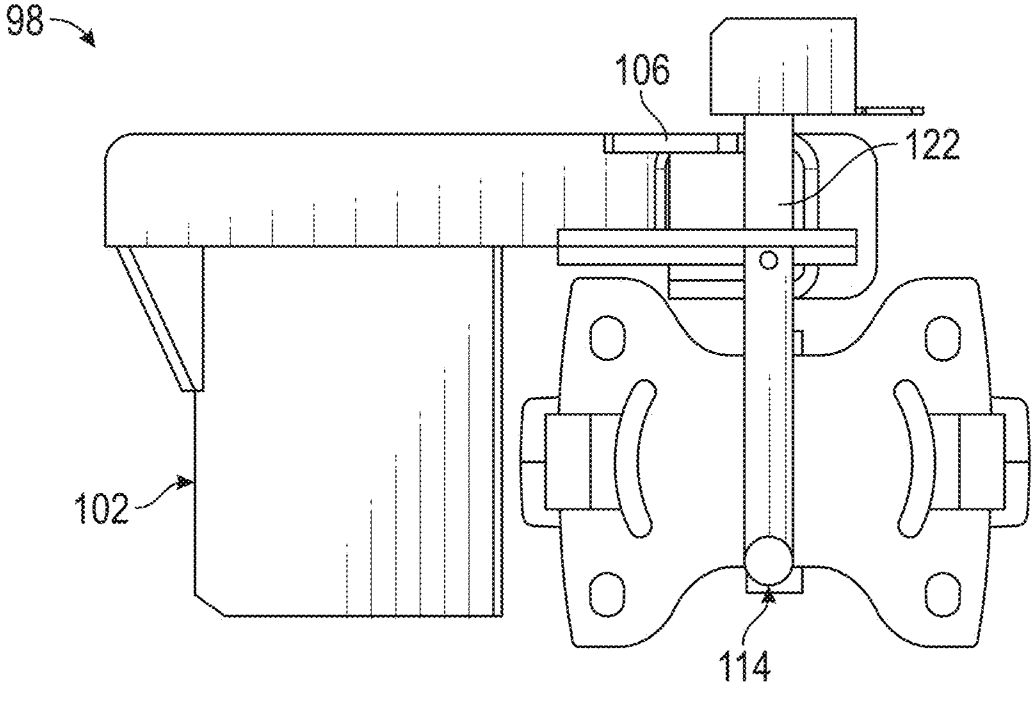
FIG. 32 is a top view of the brake and lock system.

FIG. 32 is a top view of the brake and lock system 98. In this view the lock lever 114 is in a locked position and the brake pedal 102 is in a braked orientation.

Figure 33:
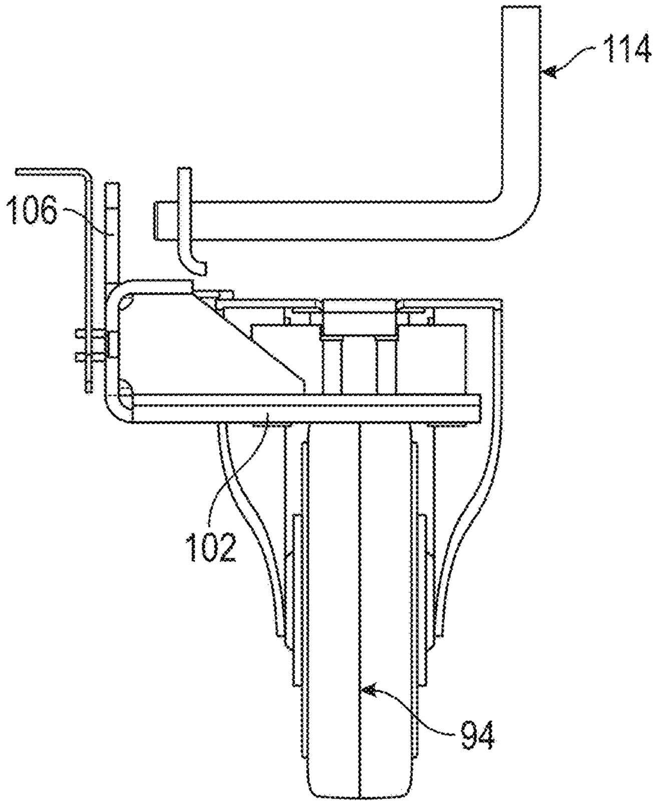
FIG. 33 is a side view of the wheel, brake, and lock system.

FIG. 33 is a side view of the wheel 94 and brake and lock system 98. In this view the lock lever 114 is in an unlocked position and the brake pedal 102 is in an unbraked position.

Figure 34:
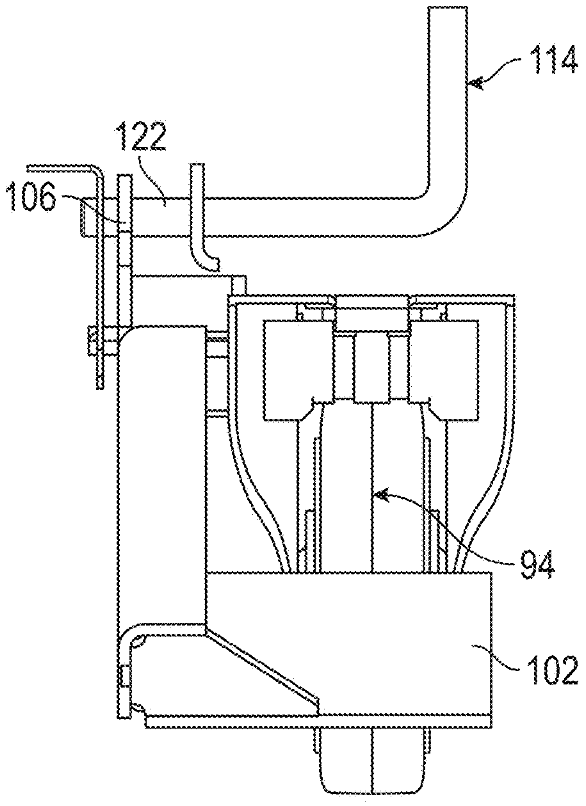
FIG. 34 is a side view of the wheel, brake, and lock system.

FIG. 34 is a side view of the wheel 94 and brake and lock system 98. In this view the lock lever 114 is in a locked position and the brake pedal 102 is in a braked orientation.

The disclosed improvements to transportation cages have many advantages. The shelf system provides for a shelf that will not shift or come attached to the cage even if the cage is turned upside down, if the cage doors are closed. The intercage locking system will allow one to easily connect and lock one cage to another, thereby preventing theft of the cages and better securing the cages. Further the intercage locking system can be configured to lock the cage to an adjacent wall, column, or pillar. Once the cages are locked together, or to a wall, they cannot be unlocked unless someone opens the cage doors. The brake and lock system will lock the brakes on the wheels into an on position, and the brakes cannot be unbraked until the doors of the cage are opened.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof.

Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A transportation cage comprising:

a first corner post;

a second corner post;

a third corner post;

a fourth corner post;

a first door rotatably attached to the first corner post, the first door configured to open outwardly from the transportation cage;

a second door rotatably attached to the fourth corner post, the second door configured to open outwardly from the transportation cage;

a first set of holes located at each of the first, second, third and fourth corner posts, the first set of holes are all at or near a first vertical height on each of the first, second, third and fourth corner posts;

a second set of holes located at each of the first, second, third and fourth corner posts, the second set of holes are all at or near a second vertical height on each of the first, second, third and fourth corner posts, the second vertical height is different than the first vertical height;

a third set of holes located at each of the first, second, third and fourth corner posts, the third set of holes are all at or near a third vertical height on each of the first, second, third and fourth corner posts, the third vertical height is different than the first and second vertical heights;

a fourth set of holes located at each of the first, second, third and fourth corner posts, the fourth set of holes are all at or near a fourth vertical height on each of the first, second, third and fourth corner posts, the fourth vertical height is different than the first, second, and third vertical heights;

a first shelf support configured to slide into the holes of a selected vertical height on the first and second corner posts when the first door is in an open configuration, the first shelf support having an opening the first shelf support having a first locking tab and a first hook;

a second shelf support configured to slide into the holes of the selected vertical height of on the third and fourth corner posts when the second door is in an open configuration, the second shelf support having an opening, the second shelf support having a second locking tab and a second hook;

a shelf configured to slide into the openings of the first shelf support and second shelf support when the first door and second door are opened, the shelf locked within the first and second shelf supports when the first and second doors are closed, the shelf configured to remain in place when the first and second doors are closed when the transportation cage is in various orientations including an upside down orientation, wherein the first hook are configure to slide into the shelf to lock the shelf in place vertically with respect to the first shelf support and wherein the second locking tab and second hook are configured to slide into the shelf to lock the shelf in place vertically with respect to the second shelf support.

2. The transportation cage of claim 1, wherein the first set of holes on the first corner post, is orthogonal to the second set of holes on the first corner post; the first set of holes on the second corner post, is orthogonal to the second set of holes on the second corner post; the first set of holes on the third corner post, is orthogonal to the second set of holes on the third corner post; and the first set of holes on the fourth corner post, is orthogonal to the second set of holes on the fourth corner post.

3. The transportation cage of claim 2, wherein the first shelf support is configured to slide into two holes on the first corner post and into two holes of the second corner post; and the second shelf support is configured to slide into two holes on the third corner post and into two holes of the fourth corner post.

4. The transportation cage of claim 3, wherein the first shelf support has first tab and second tab on a first end of the shelf support, and a third tab and fourth tab on a second end of the shelf support, the first tab is configured to slide into a first hole of the selected height on the first corner post and the second tab is configured to slide into a second hole of the selected height on the first corner post, where the second hole is orthogonal to the first hole; the third tab is configured to slide into a first hole of the selected height on the second corner post and the fourth tab is configured to slide into a second hole of the selected height on the second corner post, where the second hole is orthogonal to the first hole; and wherein the second shelf support has first tab and second tab on a first end of the shelf support, and a third tab and fourth tab on a second end of the shelf support, the first tab is configured to slide into a first hole of the selected height on the fourth corner post and the second tab is configured to slide into a second hole of the selected height on the fourth corner post, where the second hole is orthogonal to the first hole; and the third tab is configured to slide into a first hole of the selected height on the third corner post and the fourth tab is configured to slide into a second hole of the selected height on the third corner post, where the second hole is orthogonal to the first hole.

5. The transportation cage of claim 2, further comprising an Nth set of holes located at each of the first, second, third and fourth corner posts, the Nth set of holes are all at or near an Nth vertical height on each of the first, second, third and fourth corner posts, the Nth vertical height is different than the first, second, third, fourth and every other vertical heights of other sets of holes, and wherein N is a whole number greater than 4 and less than 41.

6. A transportation cage comprising:

a first corner post;

a second corner post;

a third corner post;

a fourth corner post;

one or more top bars located at the top and perimeter of the transportation cage;

each of the top bars having horizontal through slot, the through slot configured to allow passage from the interior of the cage to the exterior of the cage via the horizontal through slot;

one or more cross-top bars located at the top of the transportation cage and generally over the interior of the transportation cage;

a rod with two right angle handles slideably and rotatably located inside each of the cross-top bars, with each of the right angle handles extending out from their respective cross-top bar, one of the right angle handles configured to slide into a slot of an adjacent transportation cage's top bar horizontal through slot or a slot located on a non-cage structure adjacent to the transportation cage.

7. The transportation cage of claim 6 further comprising:

a top located above the top bars and cross-top bars, the top configured to prevent access via the top of the transportation cage to the rods.

8. The transportation cage of claim 7, wherein the top is a solid top.

9. The transportation cage of claim 7, wherein the top is a wire mesh top.

10. The transportation cage of claim 6, wherein the structure is a column, pillar, or interior wall of a cargo container.

11. A transportation cage comprising:

a first corner post;

a second corner post;

a third corner post;

a fourth corner post;

a first door rotatably attached to the first corner post, the first door configured to open outwardly from the transportation cage;

a second door rotatably attached to the fourth corner post, the second door configured to open outwardly from the transportation cage;

a first wheel located near the bottom of the first corner post;

a second wheel located near the bottom of the second corner post;

a third wheel located near the bottom of the third corner post;

a fourth wheel located near the bottom of the fourth corner post;

a brake and lock system located near the fourth wheel and in operable communication with the fourth wheel, the brake and lock system comprising:

a fourth wheel brake mechanism configured to prevent the fourth wheel from rotating when engaged;

a foot pedal configured to engage and disengage the fourth wheel brake mechanism;

a lock lever in communication with the fourth wheel brake mechanism, when the lock lever is pushed in, the lock lever prevents disengagement of the fourth wheel brake mechanism, when the lock lever is pulled out, the brake can be disengaged, the lock lever further configured such that when the lock is pushed in, the lock lever can only be pulled out if the second door is opened, if the second door is closed, and the lock lever is pushed in, the lock lever can not be pulled out.

12. The transportation cage of claim 11, wherein the fourth wheel brake mechanism is also configured to prevent the third wheel from rotating when engaged via a brake rod that extends from the fourth wheel brake mechanism to a third wheel brake mechanism.

13. The transportation cage of claim 11, further comprising:

a second brake and lock system located near the third wheel and in operable communication with the first wheel, the second brake and lock system comprising:

a first wheel brake mechanism configured to prevent the first wheel from rotating when engaged;

a foot pedal configured to engage and disengage the first wheel brake mechanism; a lock lever in communication with the first wheel brake mechanism, when the lock lever is pushed in, the lock lever prevents disengagement of the first wheel brake mechanism, when the lock lever is pulled out, the brake can be disengaged, the lock lever further configured such that when the lock is pushed in, the lock lever can only be pulled out if the first door is opened, if the first door is closed, and the lock lever is pushed in, the lock lever can not be pulled out.

14. The transportation cage of claim 13, wherein the first wheel brake mechanism is also configured to prevent the second wheel from rotating when engaged via a brake rod that extends from the first wheel brake mechanism to a second wheel brake mechanism.

* * * * *